(12) United States Patent
Bhuyan et al.

(10) Patent No.: US 6,724,780 B1
(45) Date of Patent: Apr. 20, 2004

(54) VOICE FREQUENCY DATA ENHANCEMENT METHOD

(75) Inventors: Arupjyoti Bhuyan, Naperville, IL (US); Gerald R. Boyer, Mountain Lakes, NJ (US); Ronald Robert Brown, Florham Park, NJ (US); Eric A. Deichstetter, Naperville, IL (US); Jeffrey Louis Duffany, Morristown, NJ (US); Phillip C. Goelz, Morristown, NJ (US); Daniel J. Goudzwaard, Bolingbrook, IL (US); Matthew S. Hrycko, Addison, IL (US); Hoo-Yin Khoe, Morris Plains, NJ (US); Joseph J. Kott, Aurora, IL (US); Dennis Loge, Geneva, IL (US); David Reagan Rice, Morristown, NJ (US); Brent E. Taylor, Batavia, IL (US)

(73) Assignee: Lucent Technologies INc., Murray Hill, NJ (US)

( * ) Notice: Subject to any disclaimer, the term of this patent is extended or adjusted under 35 U.S.C. 154(b) by 0 days.

(21) Appl. No.: 09/364,412

(22) Filed: Jul. 30, 1999

Related U.S. Application Data

(63) Continuation-in-part of application No. 09/018,982, filed on Feb. 5, 1998.

(51) Int. Cl.[7] .................................................. H04J 3/12
(52) U.S. Cl. ...................................... 370/523; 370/467
(58) Field of Search ............................... 370/230, 395, 370/467, 474, 479, 527, 434, 496, 523, 528; 714/708

(56) References Cited

U.S. PATENT DOCUMENTS

| | | | | |
|---|---|---|---|---|
| 5,105,443 A | * | 4/1992 | Betts et al. ................. | 375/265 |
| 5,263,080 A | * | 11/1993 | Jones et al. ............... | 379/88.19 |
| 5,347,566 A | * | 9/1994 | Law et al. ................. | 379/27.08 |
| 5,784,377 A | * | 7/1998 | Baydar et al. ............... | 370/463 |
| 5,822,420 A | | 10/1998 | Bolon et al. ................ | 379/230 |
| 5,825,780 A | * | 10/1998 | Christie ..................... | 370/522 |
| 5,883,893 A | * | 3/1999 | Rumer et al. ............ | 370/395.6 |
| 6,034,972 A | * | 3/2000 | Ward et al. ................. | 370/522 |
| 6,154,469 A | | 11/2000 | Boyer et al. ................ | 370/528 |

FOREIGN PATENT DOCUMENTS

EP    0 851 619 A2    7/1998

OTHER PUBLICATIONS

William Stallings, ISDN and Broadband ISDN with Frame Relay and ATM, third edition, pp. 294–295.*
Signaling Transmission System, by Takashi Sato, Patent Abstract of Japan, Publication No. 01316056, Published on Dec. 20, 1989, Application No. 63147573, Filed on Jun. 15, 1988.

(List continued on next page.)

*Primary Examiner*—Wellington Chin
*Assistant Examiner*—William Schultz

(57) ABSTRACT

The present invention provides a method for conveying information over a communication network such as a Digital Loop Carrier (DLC) network free of in-band signaling information for at least a portion of an established communication between at least two users so as to reduce the information error rate associated with the established communication. For communication links that support robbed-bit signaling (RBS), the RBS signaling is disabled to allow the communication link to be operated in a clear channel mode. When appropriate, operations can be switch from the clear channel mode back to the RBS mode. Embodiments are described for one-stage DLC systems having a local digital switch (LDS) connected to a remote terminal (RT) by a communication link conforming to either the TR-303 protocol or the TR-008 protocol. In addition, embodiments are described for two-stage DLC systems that also have a distance terminal (DT) connected to the RT by a second communication link.

46 Claims, 12 Drawing Sheets

OTHER PUBLICATIONS

Signaling Transmission System, Takashi Suzuki, Patent Abstracts of Japan, Publication No. 63200664, Published on Aug. 18, 1988, Application No. 62032752, Filed on Feb. 16, 1987.

Digital Loop Carrier Solutions for Voice and Data Networks, by Hoo–Yin Khoe, A. Craig Bolling, and Arupjyoti Bhuyan, Apr.–Jun. 1999, Bell Labs Technical Journal, XP–002171010, pp. 209–217.

* cited by examiner

VOICE FREQUENCY DATA ENHANCEMENT METHOD

CROSS-REFERENCE TO RELATED APPLICATIONS

This is a continuation-in-part of application Ser. No. 09/018,982 ("the '982 application"), filed on Feb. 5, 1998 as the teachings of which are incorporated herein by reference.

BACKGROUND OF THE INVENTION

1. Field of the Invention

This invention relates to telecommunications networks and, more particularly, to a method for reducing information error rates and increasing throughput of communication channels within telecommunication networks.

2. Description of the Related Art

The use of communication networks such as telephony networks and data communication networks (e.g., the Internet) by the general public to convey information has increased significantly in the past several years. The information is represented by analog and/or digital communication signals. A telephony network provides traditional telephony services (e.g., voice communications, facsimile communications, analog data) over such media as twisted metallic wire pairs (e.g., tip/ring pairs), coaxial cables, fiber optic cables, air, free space, and other media. The Public Switched Telephone Network (PSTN) is an established telephony network which is accessible to the general public. A data communication network is a network in which information signals are conveyed throughout the network in digital form. Examples of a data communication network include the public Internet and computer communication networks (e.g., corporate communication networks, educational communication networks, governmental communication networks).

Often, users of telephony networks, computer communication networks, and other communication networks gain access to such networks via local access networks such as a Digital Loop Carrier (DLC) system. An exemplary DLC system is shown in FIG. 1. DLC 10 comprises Remote Terminal (RT) 28 connected to Local Digital Switch (LDS) 20 via communication link 26. Communication signals are exchanged between LDS 20 and communication link 26 via interface 24. LDS 20 is connected to PSTN 12 and Public Internet 14 via communication links 18 and 16, respectively. Remote Terminal 28 is connected to user 1 (34) via communication link 30 and to user 2 (36) via communication link 32. Users 1 and 2 thus have access to PSTN 12, Public Internet 14, and to each other. For the sake of clarity only two users are shown in FIG. 1. In practice, DLC systems connect hundreds or even thousands of users. Moreover, an actual DLC system, such as the one shown in FIG. 1, may provide access to a variety of communication networks in addition to the ones shown.

Communication links 30 and 32 are currently implemented with metallic wires (i.e., tip/ring pairs) through which analog communication signals (e.g., voice, facsimile) are conveyed between the users (30, 32) and Remote Terminal 28. Communication links 30 and 32, when implemented as metallic tip/ring pairs, are part of the well-known Plain Old Telephone Service (POTS) telephony system and such links are commonly referred to as POTS lines. POTS lines typically are able to convey analog communication signals within a limited bandwidth spanning the frequency range of 0–4 KHz, commonly referred to as Voice Frequencies (VF). The VF range is typically further band limited to a frequency range of 200–3400 Hz due to additional analog filtering by DLC 10 equipment.

Users who wish to communicate with data communication networks, such as the Public Internet, typically use modems to transmit and receive analog data signals over the POTS lines. The analog signals from communication links 30 and 32 are converted to digital signals by RT 28 and are conveyed over communication link 26. The digital signals are processed in accordance with a protocol being followed by DLC 10 and are transferred to LDS 20 which transmits such digital signals to either PSTN 12 or Public Internet 14 via communication links 18 or 16, respectively. A protocol is a set of rules and standards that govern the operation of the various equipment of a communication network such as a local access network so as to control, monitor, and/or manage communications between users of the same or different networks and also between equipment of the same or different networks. Part of the protocol information is referred to as signaling information which is used to initiate communication between users, monitor the channel through which information is being conveyed during user communications, and terminate communications between users. The signaling information is often generated by the various communication network equipment (e.g., RT 28, LDS 20).

Before users of the same or different networks can communicate with each other, the communication is established in accordance with the protocol. A communication is established when the system has allocated appropriate network resources (e.g., a communication channel) and has followed certain procedural steps defined by the protocol, to allow users to convey communication signals to each other within a communication network or different networks. The communication signals conveyed between users is referred to as user information. Examples of protocols used by local access networks (particularly in North America) include the well-known TR-303 Hybrid Signaling protocol and the TR-008 protocol.

Still referring to FIG. 1, LDS 20 also receives user information from either PSTN 12 or Public Internet 14 and transmits such information to RT 28 which converts the information to the proper analog signal for propagation through communication links 30 or 32. The signaling information is extracted by RT 28 and the remaining user information is relayed to the users. It should also be noted that communication links 30 and 32 need not be analog POTS lines, but can be other communication links through which digital and/or analog communication signals are conveyed.

The user information conveyed through the various communication links of local access network 10 is packaged and structured in accordance with well-defined communication channel formats. An example of a communication channel format used in many local access networks and other communication networks is the well-known Digital Signal Zero (DS0) channel format. A DS0 channel is defined as a communication channel with an information capacity of 64 kbps (64,000 bits per second). Part of the information conveyed through the communication channels represents protocol information. Communication links can be also be formatted as per a Digital Signal One (DS1) structure. A DS1 contains 24 DS0 channels.

The digital signals conveyed between RT 28 and LDS 20 over communication link 26 are organized in a particular fashion dictated by the protocol being followed by the local access network.

Referring to FIG. 2, there is shown how digital signals are organized and conveyed over communication link 26 between LDS 20 and RT 28 as per the TR-303 Hybrid Signaling protocol. Communication link 26 is organized as a DS1. Typically, the analog signals from the users are sampled by RT 28 at a rate of 8000 samples per second. RT 28 converts each sample to an 8-bit word, which is then placed in a particular DS0 channel within the DS1 of communication link 26. In particular, the digital signals are organized as frames 38, with each frame being 125 $\mu$sec long (i.e., length of one sample). Each frame 38 comprises data for 24 DS0 channels 40, where each DS0 channel contains the 8 bits of data representing a sample from a particular user, and a framing bit 43 used as an indicator for separating the frames. Thus, a DS1 can serve up to 24 separate users.

The TR-303 Hybrid Signaling protocol allows signaling information to be integrated with user information and both types of information are conveyed through the DS1. Such a technique of integrating user information with signaling information is commonly referred to as in-band signaling (or in-slot signaling). Still referring to FIG. 2, part of each user's information, and in particular, the least significant bit 42 of each DS0 channel of every sixth frame is discarded and replaced with a signaling bit that represents signaling information for that DS0 channel. The information that replaces the discarded user information is referred to as in-band signaling information. The in-band'signaling scheme where the least significant bit of user information is purposely discarded and replaced with signaling information is referred to as robbed-bit signaling (RBS). The TR-303 Hybrid Signaling protocol uses the robbed-bit signaling scheme.

FIG. 2 discloses a particular form of RBS structured in what is commonly known as a DS1 frame format. In this particular version of RBS, the least significant bit 42 of every DS0 channel within the 6th frame, the 12th frame, the 18th frame, the 24th frame, etc., is replaced with signaling information. For purposes of clarity, only the configuration of the 6th frame is shown in FIG. 2.

As the popularity of data communication networks such as the Internet increases, there is an ever increasing need by users of local access networks to convey information to and from such networks at higher and higher speeds. At such high speeds and in view of the limited bandwidth of the POTS lines, signal degradation is often a problem. The analog data signals tend to be more susceptible to noise and are more easily distorted by bandwidth limited media such as POTS lines.

It will be readily understood that the use of the RBS scheme, or other in-band signaling schemes, in which part of the user information is sacrificed for signaling information, is another contributor to the signal degradation suffered by local access network 10 and other similar communication networks. The use of in-band signaling schemes often degrades the performance of local access networks and other communication networks, because of the increase in the information error rate (e.g., high bit error rates) and/or lowered throughput. Typically, a certain amount of errors occurs in the conveyance of user information at a particular speed for a particular amount time. For a certain time period, the ratio of the amount of errors occurring in conveyed user information to the amount of user information is defined as information error rate. The throughput is defined as the actual amount of information conveyed. Often, subscribers or the local access network equipment must reduce the speed at which information is being conveyed through the local access network in order to lower the information error rates to an acceptable level. For example, many subscribers who use 56 Kb/s, 33.6 Kb/s or even 28.8 Kb/s modems to convey information through communication channels of local access networks have to operate their modems at lower speeds because of the exacerbating effects of in-band signaling such as RBS. As a result, the throughput of these communication channels is decreased.

It is therefore, an object of the present invention to eliminate substantially the adverse effects (e.g., increased information error rate, lowered throughput) of in-band signaling schemes such as RBS during communications between users of local access networks or other communication networks.

SUMMARY OF THE INVENTION

The present invention provides for a method, which when applied to a communication network that uses in-band signaling, suspends the application of in-band signaling for at least a portion of established communication between at least two users of the communication so as to reduce information error rates associated with the established communication. The method of the present invention comprises the steps of establishing communication between at least two users in accordance with a protocol and conveying information free of in-band signaling information so as to reduce information error rates associated with the conveyed user information.

In one embodiment, the present invention is a method for conveying information in a communication network, the method comprising the steps of (a) establishing communication in accordance with a protocol; and (b) conveying user information free of in-band signaling information so as to reduce information error rates associated with the conveyed user information.

In another embodiment, the present invention is a method for conveying information in a local access network that follows a protocol which uses in-band signaling, the method comprising the steps of (a) establishing communication between at least two users in accordance with the protocol; (b) suspending in-band signaling; (c) entering a clear channel mode; (d) remaining in the clear channel mode until it is determined that conditions exist which warrant returning to in-band signaling; and (e) ending the established communication when at least one of the users terminates communication.

In yet another embodiment, the present invention is a method for conveying information in a DLC communication network that follows the TR-303 Hybrid or TR-008 Signaling protocol, the method comprising the steps of (a) establishing communication between at least two users using a DS1 frame format for the robbed-bit signaling scheme in accordance with the TR-303 Hybrid or TR-008 Signaling protocol; (b) suspending the use of robbed-bit signaling; (c) entering a clear channel mode; (d) resuming robbed-bit signaling when it has been determined that conditions exist that warrant returning to in-band signaling; and (e) ending the established communication as per the TR-303 Hybrid or TR-008 Signaling protocol when at least one of the users goes on hook.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

The present invention provides a method, which when applied to a communication network that uses an in-band signaling scheme, suspends the application of the in-band signaling for at least a portion of established communications between users of the communication network during which the communication network operates in a clear channel mode that serves to reduce information error rates associated with the established communication. The clear channel mode occurs after communication between at least two users is established. In the clear channel mode, no in-band signaling information is conveyed; the user information is conveyed free of signaling information. The duration of the clear channel mode may occur for part or all of the established communication between users.

It will be readily understood that the method of the present invention is applicable to all protocols which use an in-band signaling scheme. It should further be understood that the implementation of the present invention within existing communication networks that comply with an in-band signaling protocol can be made transparent to the operation of such networks. As such, the present invention represents an added feature to protocols with in-band signaling and allows such protocols to operate in the clear channel mode without adversely affecting in any significant manner their standard operation. Furthermore, the method of the present invention will first be described in the context of DLC 10 of FIG. 1. However, it should be readily obvious to one skilled in the art to which this invention belongs that the method of the present invention is applicable to other types of communication networks and is not limited to local access networks such as DLC 10.

Figure 1:
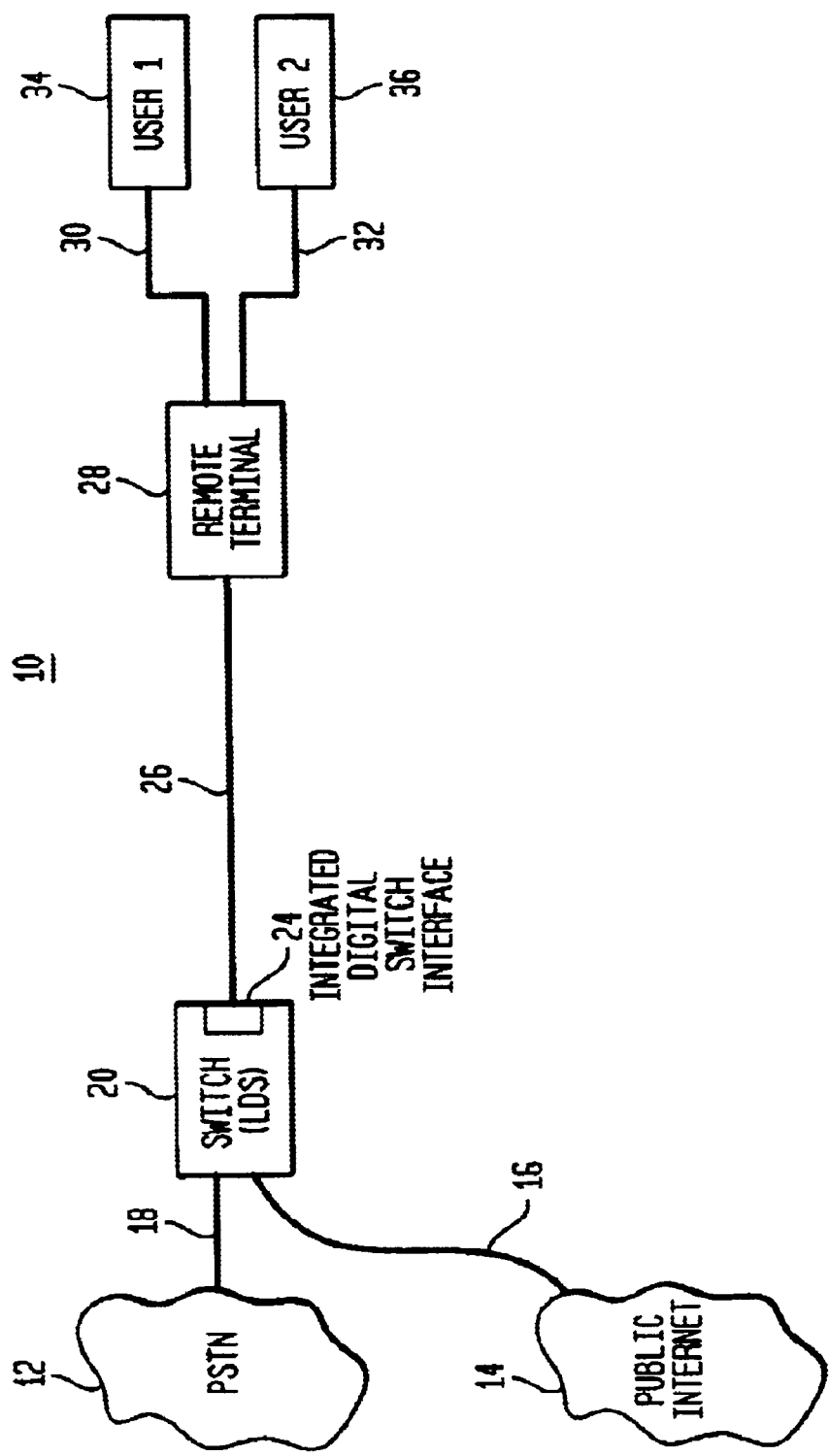
FIG. 1 is a block diagram of an exemplary local access communication network called a Digital Loop Carrier (DLC) system.
Figure 2:
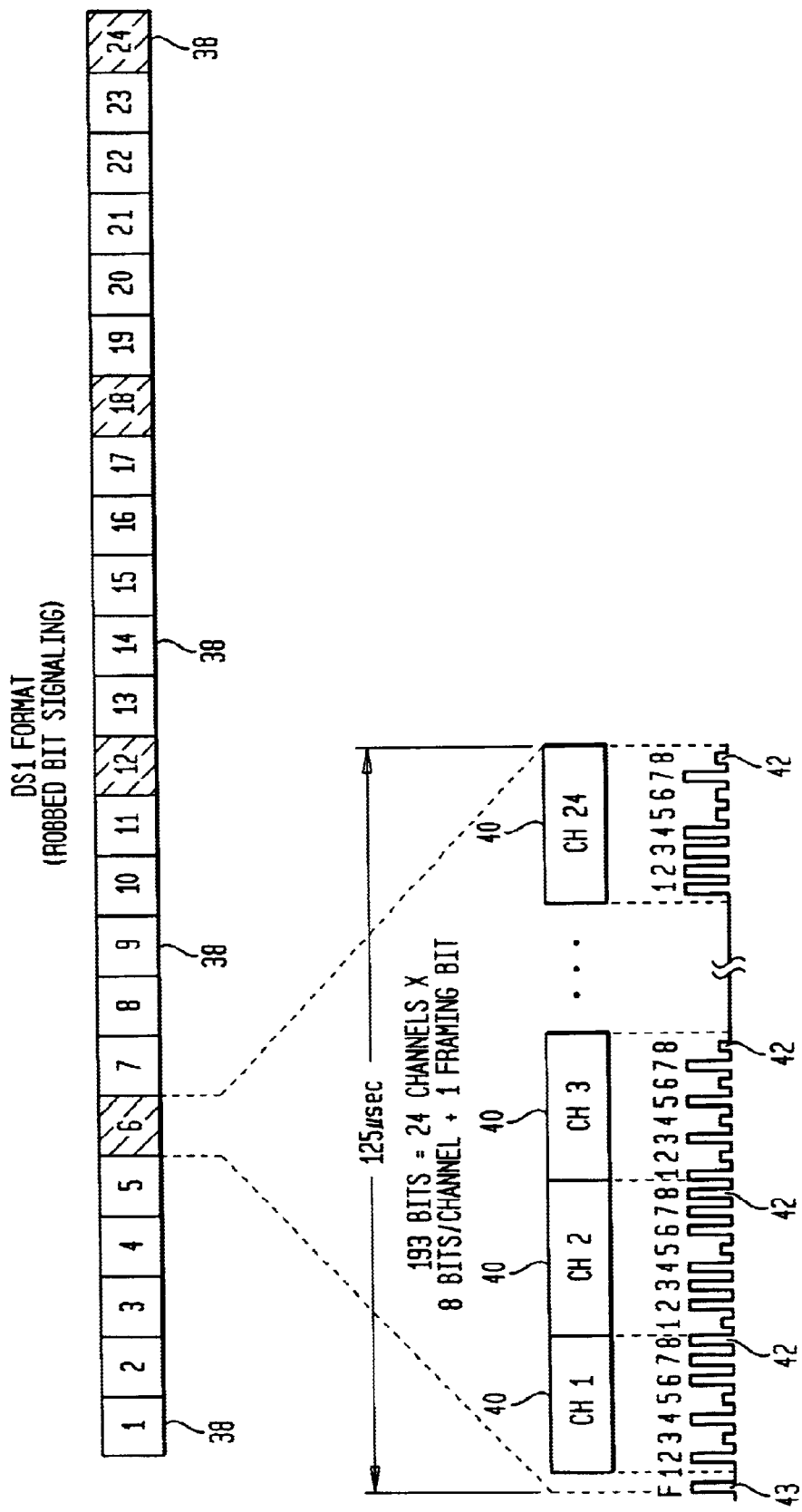
FIG. 2 is a diagram of a data structure for a DS1 frame format for the robbed-bit signaling (RBS) scheme.
Figure 3:
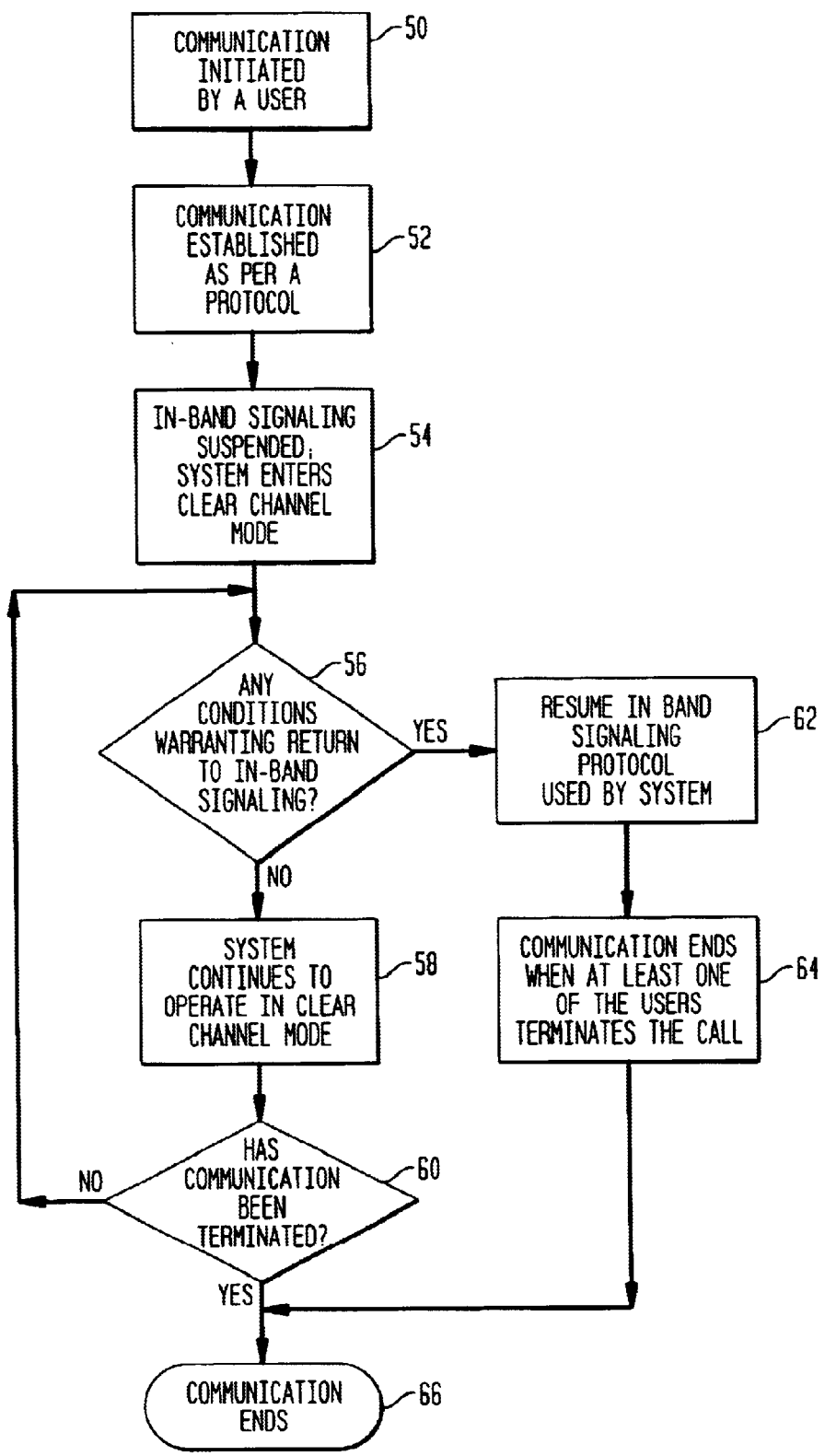
FIG. 3 is a flowchart of a method according to one embodiment of the present invention.

FIG. 3 depicts a method according to one embodiment of the present invention which starts with step 50 in which communication is initiated by a user of a local access network such as DLC 10 of FIG. 1. For example, referring back to FIG. 1, user 134 may wish to communicate via a modem to a user within PSTN 12 or Public Internet 14. User 1 does this by placing a call to the other user. A call is defined as the completion of an established communication and the conveyance of information between at least two users of the same or different networks in accordance with the protocols of the networks. Users can communicate with each other with communicating devices such as modems, telephones, facsimile machines, and computers. User 1 first goes off hook which is a condition that is detected by DLC 10, in particular, RT 28. Referring again to FIG. 3, the method now moves to step 52.

In step 52, DLC 10 and the communication network associated with the called user take the appropriate steps as per their respective protocols to establish communication between user 1 and the called user. At this point, the established communication is using in-band signaling. Once communication is established between user 1 and the called user, the method moves to step 54 where in-band signaling is suspended. In step 54, DLC 10 enters the clear channel mode in which user information conveyed between RT 28 and LDS 20 has no in-band signaling information thus reducing the information error rates associated with the conveyed user information. In many protocols that use in-band signaling, there exists a separate or out-of-band channel through which specific signaling information is conveyed apart from the user information. For example, the TR-303 Hybrid Signaling protocol has a Timeslot Management Channel (TMC) that is designed to convey timeslot management messages. The TMC is implemented as a DS0 channel within communication link 26. During the clear channel mode, a communication system that complies with the TR-303 Hybrid Signaling protocol, for example, may use the TMC to convey other specific signaling information (e.g., on-hook/off-hook/flash-hook status) between RT 28 and LDS 20, which the TMC was not originally designed to convey. DLC 10 remains in the clear channel mode (i.e., suspension of in-band signaling) for a period of time that is equal to or less than the remainder of the established communication.

In step 56, the method determines whether any condition has occurred within DLC 10 which would warrant a return to in-band signaling. Many communication networks offer various features (e.g., 3-way calling, call waiting) which when activated (e.g., by a user flash hook) can be more efficiently implemented with in-band signaling. It should be noted however that the implementation of such features is dependent upon the particular design of the communication network and that such features may not necessarily specifically require the use of in-band signaling. If no such conditions occur during communication between the users, the system may operate in the clear channel mode for the remainder of the established communication. In step 62, the method has determined that it should return to in-band signaling mode. The method remains in the in-band signaling mode until step 64 where at least one of the users terminates the communication (e.g., user goes on hook). In step 66, the method ends the communication in accordance with the particular protocol being followed by the communication system.

Referring back to step 56, when there exist no conditions warranting the return to in-band signaling, the method moves to step 58 where the communication system continues to operate in the clear channel mode until communication has been terminated (step 60) in which case the system moves to step 66 or conditions warranting return to in-band signaling occur in which case the communication system operates in the manner described above (i.e., steps 62, 64, and 66).

TR-303 DLC Systems

Figure 4:
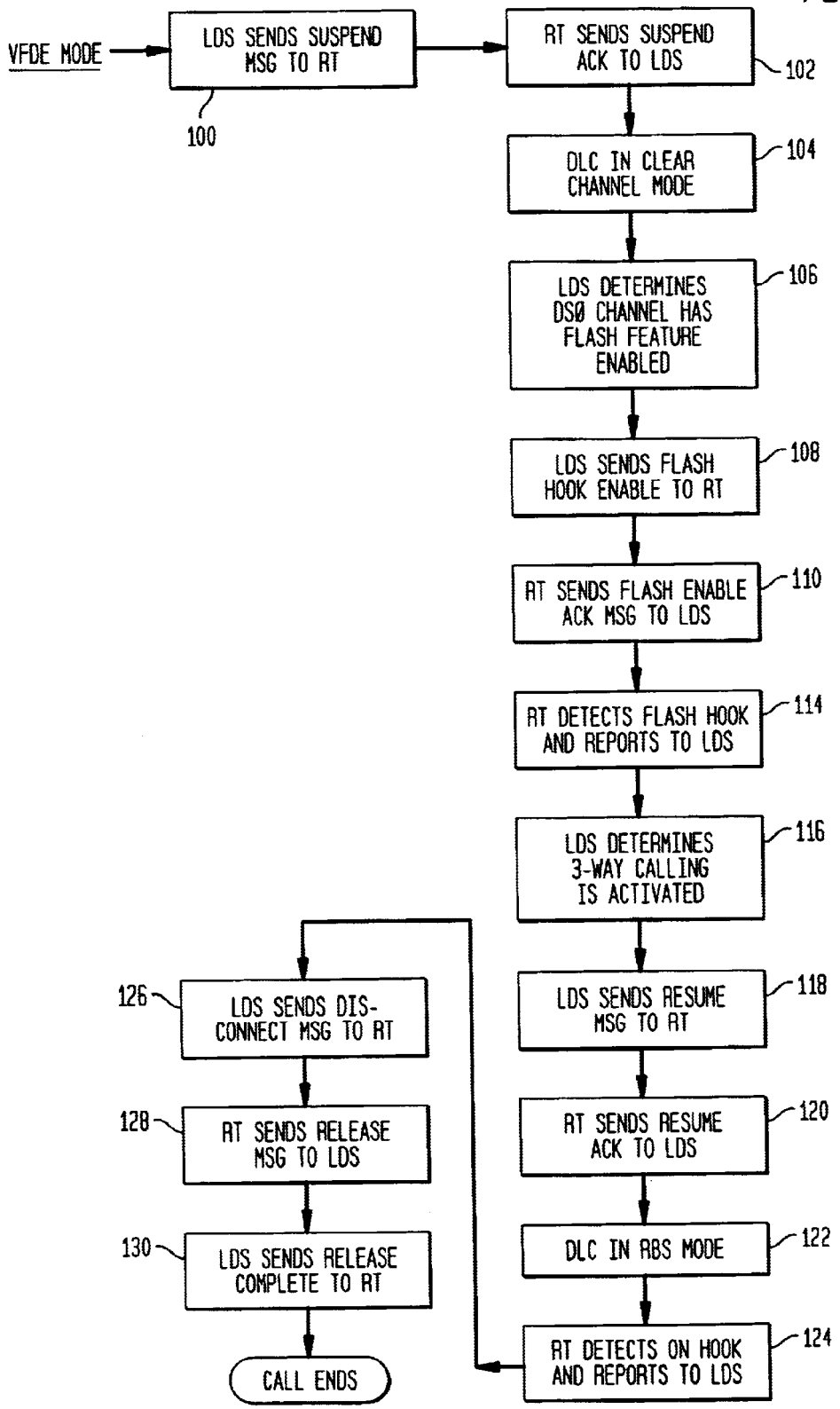
FIG. 4 is a flowchart of the method of FIG. 3 implemented in accordance with the TR-303 hybrid signaling protocol.

FIG. 4 depicts an example of a specific version of the method of FIG. 3 implemented in accordance with the TR-303 Hybrid Signaling protocol. More particularly, FIG. 4 depicts a particular procedure (using the TR-303 Hybrid Signaling protocol) of the method of FIG. 3 applied to a feature commonly referred to as the 3-way calling feature. The 3-way calling feature is a well-known characteristic provided by many telephony systems which allows three users to communicate with each other simultaneously. The 3-way calling feature is activated in the following manner: (1) User 1 calls User 2; either the calling party (User 1) or the called party (User 2) can activate the 3-way calling feature. Say, for example, User 1 wishes to add a third party to the call; (2) User 1 performs a flash hook, i.e., User 1 presses and releases the telephone hookswitch; this action is recognized by the communication system as a flash hook; (3) User 1 now hears a dial tone and then proceeds to dial the third party's number; (4) User 1 can now communicate to the third party and after performing another flash hook can communicate with the third party and User 2 simultaneously.

FIG. 4 shows how the method of FIG. 3 can be applied to a specific protocol (TR-303 Hybrid Signaling protocol) to implement a specific feature (i.e., 3-way calling) provided by a communication system such as DLC 10. As such, FIG. 4 is simply an illustrative procedure that shows how the method of FIG. 3 can be integrated within a particular protocol being followed by a particular communication system. A similar procedure can be implemented for other features (e.g., call-waiting) and/or other communication systems.

Prior to step 100 of FIG. 4, communication is established between at least two users of a communication system such as DLC 10 in accordance with the TR-303 Hybrid Signaling protocol. The system has provided a DS0 channel from the DS1 of communication link 26 for conveying information (user and signaling) between the users. Furthermore, one of the users has called the other and thus communication (exchange of communication signals) between the two users is about to start. The communication system will follow the steps of the method of FIG. 3 while still complying with the TR-303 Hybrid Signaling protocol.

In step 100, LDS 20 transmits a "suspend" message to RT 28 via the TMC. The "suspend" message instructs RT 28 to suspend the use of robbed-bit signaling. In step 102, RT 28 puts the upstream direction of the DS0 channel allocated for the call in a clear channel mode and sends a "suspend acknowledge" message to LDS 20 via the TMC. Upon processing the "suspend acknowledge" message, the LDS then places the downstream direction of the allocated DS0 into clear channel mode. In step 104, the system enters the clear channel mode. The user information being conveyed through the allocated DS0 channel does not have any embedded signaling information; i.e., there is no in-band signaling. Instead, some of the signaling information is conveyed through an out-of-band channel (e.g., the TMC). Preferably DLC 10 enters the clear channel mode within 300 milliseconds from the time communication between user 1 and the called user is established.

In step 106, LDS 20 determines that the DS0 channel allocated for the call has the flash-hook feature enabled. The system then moves to step 108 where LDS 20 sends a "flash-hook enable" message via the TMC to RT 28. In response, in step 110, RT 28 sends a "flash-hook enable acknowledge" message to LDS 20 via the TMC. In step 114, RT 28 detects a flash hook (one of the users has applied a flash hook to initiate 3-way calling as described above) and reports it, via the TMC, to LDS 20. In step 116, LDS 20 determines that 3-way calling has been activated and that the system should return to RBS (i.e., in-band signaling) to collect the dialed digits for the third party origination. In step 118, LDS 20 converts the downstream DS0 channel to RBS mode and sends a "resume" message to RT 28 instructing RT 28 to activate the RBS scheme. In response, in step 120, RT 28 processes the resume message, converts the upstream DS0 channel to RBS mode, begins monitoring the received downstream DS0 channel for robbed-bit signals, and sends a "resume acknowledge" message to LDS 20. Upon receiving the "resume acknowledge" message, LDS 20 begins to monitor the received upstream DS0 channel for robbed-bit signals. The system moves to step 122 in which the RBS scheme is activated. The system continues to operate in the RBS mode until RT 28 detects an on-hook condition and consequently moves to step 124 where RT 28 reports the on-hook condition to LDS 20. Since the DS0 channel is in RBS mode, the on-hook report will be sent via both the TMC and RBS signaling.

When an on-hook condition is detected, the method moves to step 126 in which LDS 20 sends a "disconnect" message to RT 28. In step 128, RT 28 sends a "release"

message to LDS 20. In step 130, LDS 20 sends a "release complete" message to RT 28. At this point, the established communication is terminated and the allocated DS0 channel is now made available for future communications.

The processing of FIG. 4 is limited to the example of 3-way calling. Those skilled in the art will understand that appropriate procedures would be implemented for functions other than 3-way calling (e.g., call waiting) supported by the system. In such cases, the method would certainly apply procedures that are consistent with the protocol being followed by the communication system. It will be readily understood by those skilled in the art to which this invention belongs that the method of the present invention can be modified to apply to any and all features of protocols that use in-band signaling and that FIG. 4 is simply one example of a particular application.

FIGS. 1–4 have been described in the context of a one-stage DLC system having an local digital switch connected to a remote terminal by a communication link that conforms to the TR-303 protocol. As suggested above, the present invention can be implemented in other contexts, such as DLC systems having communication links conforming to other protocols, such as the TR-008 protocol, and/or DLC systems having two stages. The following sections discuss implementations of the present invention in some of these other contexts.

TR-008 DLC Systems

Figure 5:
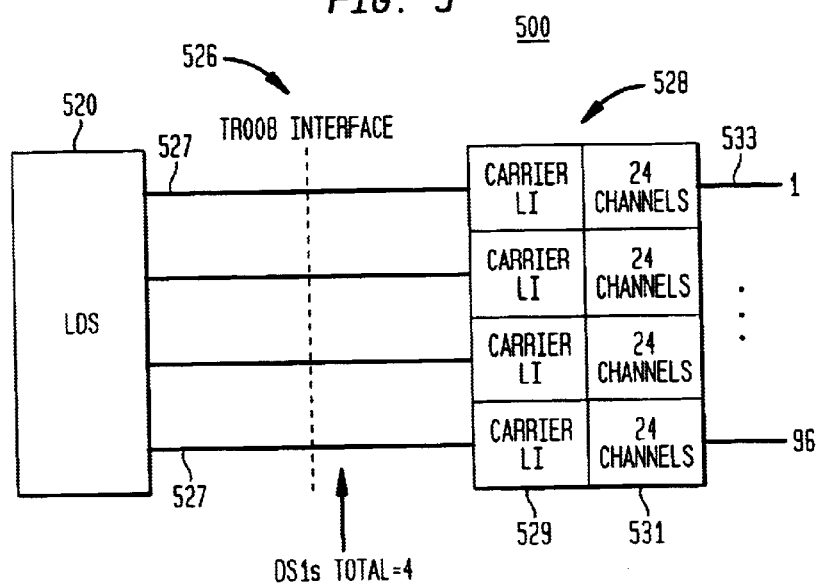
FIG. 5 shows a block diagram of a one-stage DLC system having a local digital switch connected to an remote terminal by a communication link that conforms to the TR-008 protocol.

FIG. 5 shows a block diagram of a portion of a one-stage DLC system 500 having an LDS 520 connected to an RT 528 by a communication link 526 that conforms to the TR-008 protocol. Communication link 526 comprises four DS1s 527 (also referred to as the DS1 A, B, C, and D channels), each of which comprises 24 DS0 channels (not shown). For these four DS1s, RT 528 has corresponding carrier line interfaces (CLIs) 529 and channel units (CUs) 531. RT 528 can support communications for up to 96 different users (not shown) via subscriber lines 533.

According to the TR-008 protocol, each subscriber line 533 has a dedicated DS0 channel and, unlike the TR-303 protocol, TR-008 communication link 526 has no timeslot management channels. As such, the method of FIG. 4 for switching operations between robbed-bit signaling mode and clear channel mode relying on a TMC cannot be implemented for TR-008 DLC system 500.

Figure 6:
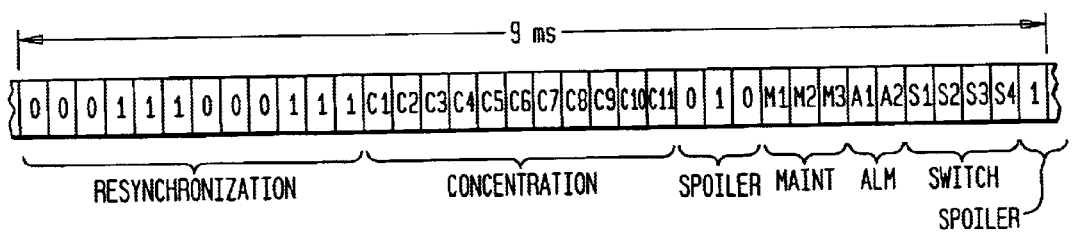
FIG. 6 shows a diagram of the TR-008 data link format.

According to the TR-008 protocol, the DS1 A has a data link in both the downstream and upstream directions that is used to carry maintenance, alarm, and facility switching information, where the data link corresponds to some of the DS1 signaling frame bits. FIG. 6 shows a diagram of the TR-008 data link format, which is transmitted over the DS1 A once every 9 msec. As shown in FIG. 6, the TR-008 data link format has an 11-bit concentration field consisting of bits C1–C11. In TR-008 Mode 2 operations (where 48 lines share one DS1), this concentration field is used for timeslot assignments. However, in TR-008 Mode 1 operations (where there is one dedicated DS0 per line), the concentration field is not used.

According to one embodiment of the present invention, all four DS1s are configured to carry a data link having the TR-008 format of FIG. 6, although only the data link of the DS1 A is used to carry valid maintenance, alarm, and facility switching information. According to this embodiment, DLC system 500 uses the 11-bit concentration field in the data link format of each DS1 for signaling to support switching between RBS mode and clear channel mode for the individual DS0 channels of that DS1. According to one particular implementation, the 24 DS0 channels in each DS1 are logically divided into three sets of 8 DS0 channels, where the first two bits (C1–C2) of the concentration field are used to identify one of the three DS0 channel sets and the next eight bits (C3–C10) are used for signaling bits for the 8 DS0 channels of that set. For example, C3 is a signaling bit for the first DS0 channel of the set identified by bits C1–C2, C4 is a signaling bit for the second DS0 channel of the set, etc. (Of course, other possibilities exist for assigning and using the particular bits of the TR-008 data link concentration field for such signaling.) In this way, a signaling bit can be transmitted for each of the 24 DS0 channels in each DS1 every 27 msec (i.e., three different consecutive instances of the 9-msec TR-008 data link format of FIG. 6, each different instance corresponding to a different set of 8 DS0 channels in the DS1). These signaling bits can be used to convey information/instructions between LDS 520 and RT 528 in the downstream and/or upstream directions to implement switching between RBS mode and clear channel mode within DLC system 500.

According to the present invention, a switch from RBS mode to clear channel mode within DLC system 500 is always initiated at LDS 520, while a switch from clear channel mode back to RBS mode may be initiated either at LDS 520 or at RT 528, depending on the situation. Assume, for example, that a local user (i.e., a user connected directly to RT 528 via one of the subscriber lines 533) is communicating with a remote user (i.e., a user connected to a completely different DLC system that is in turn connected to LDS 520 of DLC system 500, e.g., via a PSTN or public Internet as in FIG. 1). When the local user performs a flash hook to initiate a 3-way call, the switch from clear channel mode back to RBS mode will be initiated at RT 528. On the other hand, when the remote user performs the flash hook to initiate the 3-way call, the switch from clear channel mode back to RBS mode will be initiated at LDS 520.

Whether the LDS and the RT are operating in RBS mode or clear channel mode may affect different operations performed within those nodes. These operations include: (1) whether or not the LDS generates downstream signals for transmission to the RT using robbed-bit signaling, (2) whether or not the RT monitors the downstream signals received from the LDS for robbed-bit signals, (3) whether or not the RT generates upstream signals for transmission to the LDS using robbed-bit signaling, and (4) whether or not the LDS monitors the upstream signals received from the RT for robbed-bit signals.

The order in which these functions are affected is important. For example, for switching from RBS mode to clear channel mode, the initiating end should stop acting upon the received robbed-bit signals first (i.e., switch to clear channel mode in its received direction), while maintaining RBS signaling in its transmitted direction until the other end switches to clear channel mode at which time the initiating end can switch to clear channel mode in its transmitted direction. Otherwise, meaningless bits could be misinterpreted leading to undesirable effects (e.g., phone ringing at wrong time).

In two particular implementations of the present invention referred to below as the S1 and S2 methods, during the RBS mode for a particular DS0 channel, (1) the LDS generates downstream DS0 signals for transmission to the RT using RBS signaling, (2) the RT monitors the downstream DS0 signals received from the LDS for robbed-bit signals, (3) the RT generates upstream DS0 signals for transmission to the LDS using RBS signaling, and (4) the LDS monitors the upstream DS0 signals received from the RT for robbed-bit signals.

Similarly, during the clear channel mode for the DS0 channel, (1) the LDS generates downstream DS0 signals for transmission to the RT without using RBS signaling, (2) the RT ceases to monitor the downstream DS0 signals received from the LDS for robbed-bit signals, (3) the RT generates upstream DS0 signals for transmission to the LDS without using RBS signaling, and (4) the LDS ceases to monitor the upstream DS0 signals received from the RT for robbed-bit signals. At all times, however, whether operating in the RBS mode or the clear channel mode, the LDS and RT continue to monitor the data link signaling bits for the DS0 channel contained in the concentration fields of the upstream and downstream data link signals, respectively.

S1 Method

In an implementation of the present invention called the S1 method for TR-008 DLC system 500 of FIG. 5, in the LDS-to-RT (downstream) direction, LDS 520 tells RT 528 whether communication link 526 should be in RBS mode or clear channel mode. For an originating call, the LDS tells the RT to go to clear channel mode after the LDS has finished collecting the dialed digits from the callee. For a terminating call, the LDS tells the RT to go to clear channel mode after the callee goes off hook. When there is a condition where RBS signaling is to be resumed (e.g., the caller or callee performs a flash hook), the LDS signals the RT to return to RBS mode. (Once a flash is detected, it can be assumed that the call is not a modem call and that therefore operations can revert to RBS mode.)

In this S1 method, the data link signaling bits (i.e., the data in the concentration field of the TR-008 data link format) in the downstream direction indicate whether LDS 520 wants RT 528 to operate in RBS mode or clear channel mode for the corresponding DS0 channels, while the data link signaling bits in the upstream direction simply indicate the current on-hook/off-hook status for the corresponding subscriber lines. For example, a downstream data link signaling bit value of 1 may indicate RBS mode and 0 may indicate clear channel mode for the corresponding DS0 channel, while an upstream data link signaling bit value of 1 may indicate an off-hook status and 0 may indicate an on-hook status for the corresponding subscriber line.

Figure 7:
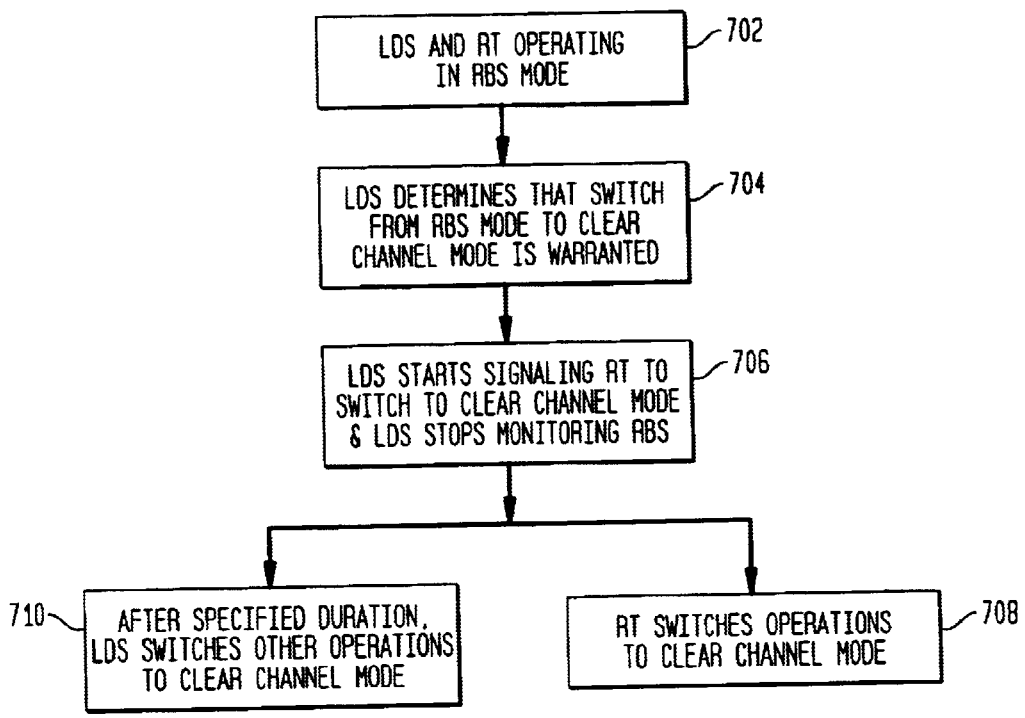
FIG. 7 shows a flow diagram of the processing implemented within the DLC system of FIG. 5 for a switch from RBS mode to clear channel mode for a particular DS0 channel, according to one embodiment of the S1 method of the present invention.

FIG. 7 shows a flow diagram of the processing implemented within DLC system 500 for a switch from RBS mode to clear channel mode for a particular DS0 channel, according to one embodiment of the S1 method of the present invention. The processing of FIG. 7 corresponds to step 54 of FIG. 3. At the start of processing (step 702), both LDS 520 and RT 528 are assumed to be operating in RBS mode.

After the LDS determines that a switch from RBS mode to clear channel mode is warranted (step 704), the LDS begins to signal the RT to switch to clear channel mode using the corresponding signaling bits in the downstream data link and the LDS ceases to monitor the corresponding upstream DS0 channel for robbed-bit signals (step 706). After waiting for a specified duration (e.g., 72 msec), the LDS switches the rest of its operations to clear channel mode (step 710). This involves ceasing to use RBS signaling in generating the corresponding downstream DS0 channel.

Meanwhile, after receiving the clear channel mode signal from the LDS, the RT changes its operations to clear channel mode (step 708). Here, too, this involves both (1) ceasing to use robbed-bit signaling in generating the corresponding upstream DS0 channel and (2) ceasing to monitor the corresponding downstream DS0 channel for robbed-bit signals. To ensure stable system operations, the RT preferably verifies that the corresponding downstream data link signaling bit has maintained the clear channel mode value for a specified duration (e.g., 36 msec) before changing its operations to clear channel mode.

While in clear channel mode, the LDS retrieves on-hook/ off-hook information from the concentration field bits in the data link instead of from robbed-bits in the DS0 channel. In the S1 method, the LDS always makes the decision as to whether a change from clear channel mode back to RBS mode is warranted. The LDS processes the upstream data link signaling bits to determine whether a switch from clear channel mode back to RBS mode is warranted (e.g., a flash has been detected), in which case, the LDS changes the corresponding data link signaling bits in the downstream direction to instruct the RT accordingly.

Figure 8:
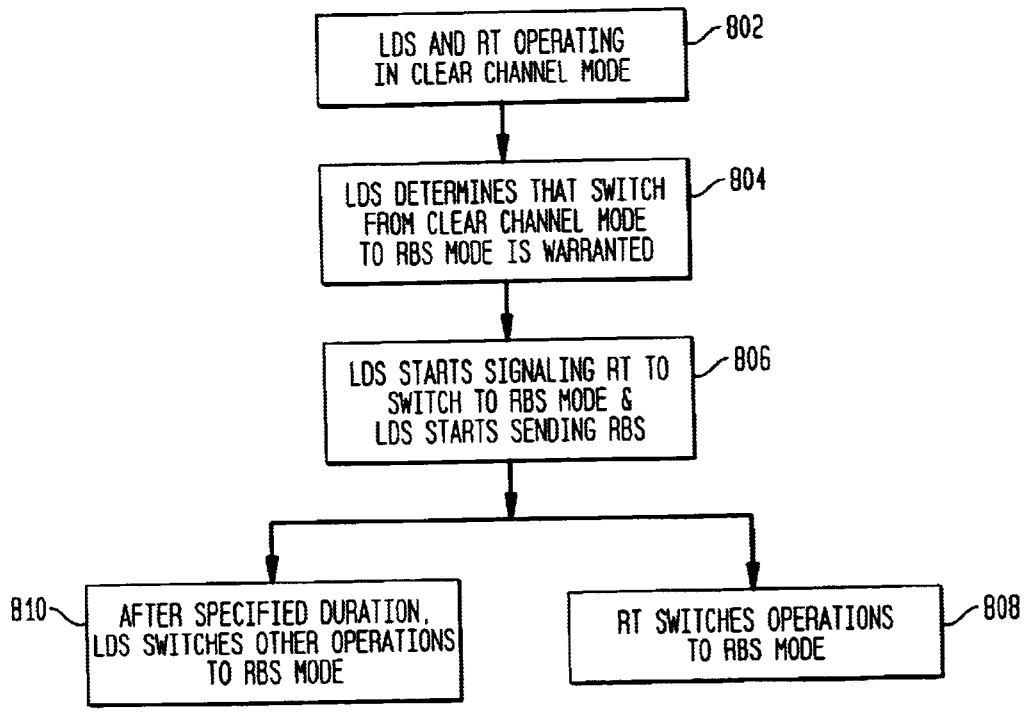
FIG. 8 shows a flow diagram of the processing implemented within the DLC system of FIG. 5 for a switch from clear channel mode back to RBS mode for a particular DS0 channel, according to one embodiment of the S1 method of the present invention.

FIG. 8 shows a flow diagram of the processing implemented within DLC system 500 for a switch from clear channel mode back to RBS mode for a particular DS0 channel, according to one embodiment of the S1 method of the present invention. The processing of FIG. 8 corresponds to steps 56 and 62 of FIG. 3. At the start of processing (step 802), both LDS 520 and RT 528 are assumed to be operating in clear channel mode.

After the LDS determines that a switch from clear channel mode back to RBS mode is warranted (step 804), the LDS begins to signal the RT to switch to RBS mode using the corresponding signaling bits in the downstream data link and the LDS starts to use RBS signaling in generating the corresponding downstream DS0 channel (step 806). After waiting for a specified duration (e.g., 72 msec), the LDS switches its own operations back to RBS mode (step 810). This involves starting to monitor the corresponding upstream DS0 channel for robbed-bit signals.

Meanwhile, the RT receives the RBS mode signal from the LDS and switches its operations to RBS mode (step 808). Here, too, this involves both (1) starting to use RBS signaling in generating the corresponding upstream DS0 channel and (2) starting to monitor the corresponding downstream DS0 channel for robbed-bit signals. To ensure stable system operations, the RT preferably verifies that the corresponding downstream data link signaling bit has maintained the RBS mode value for a specified duration (e.g., 36 msec) before changing its operations to clear channel mode.

In the S1 method, no acknowledgment is sent back from the RT to the LDS for either RBS-to-clear-channel mode switching or clear-channel-to-RBS mode switching.

S2 Method

In an alternative implementation of the present invention called the S2 method for TR-008 DLC system 500, RT 528—rather than LDS 520—monitors the subscriber line on-hook/off-hook status information to determine whether a switch from clear channel mode back to RBS mode is warranted for each corresponding DS0 channel. Depending on the implementation, this processing may be performed by the corresponding channel unit or by the corresponding carrier line interface of RT 528. In either case, like the downstream data link signaling bits, each data link signaling bit in the upstream direction for the S2 method indicates whether the corresponding DS0 channel should be operated in RBS mode or clear channel mode. Unlike the S1 method, in the S2 method, the LDS requires acknowledgment from the RT before completing a mode switch.

Figure 9:
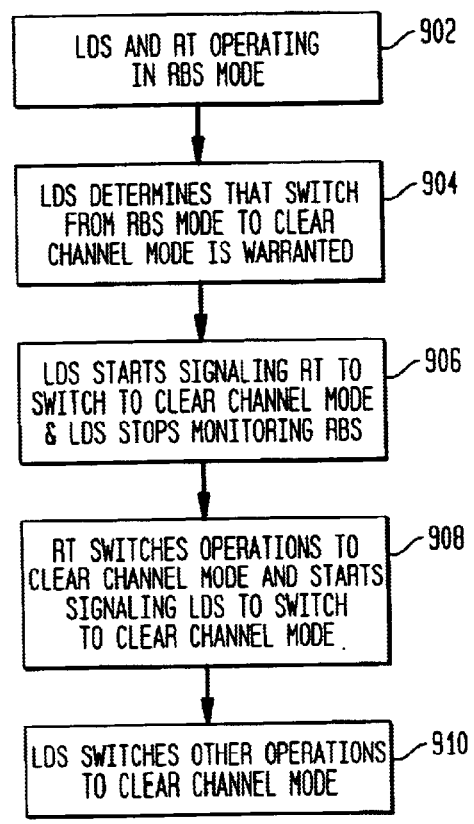
FIG. 9 shows a flow diagram of the processing implemented within the DLC system of FIG. 5 for a switch from RBS mode to clear channel mode for a particular DS0 channel, according to one embodiment of the S2 method of the present invention.

FIG. 9 shows a flow diagram of the processing implemented within DLC system 500 for a switch from RBS mode to clear channel mode for a particular DS0 channel, according to one embodiment of the S2 method of the present invention. The processing of FIG. 9 corresponds to step 54 of FIG. 3. At the start of processing (step 902), both LDS 520 and RT 528 are assumed to be operating in RBS mode.

After the LDS determines that a switch from RBS mode to clear channel mode is warranted (step 904), the LDS begins to signal the RT to switch to clear channel mode using the corresponding signaling bits in the downstream data link, and the LDS stops monitoring the corresponding upstream DS0 channel for robbed-bit signals (step 906).

The RT receives the clear channel mode signal from the LDS and switches its operations to clear channel mode (step 908). This involves both (1) ceasing to use robbed-bit signaling in generating the corresponding upstream DS0 channel and (2) ceasing to monitor the corresponding downstream DS0 channel for robbed-bit signals. To ensure stable system operations, the RT preferably verifies that the corresponding downstream data link signaling bit has maintained the clear channel mode value for a specified duration (e.g., 36 msec) before changing its operations to clear channel mode. At that time, the RT starts signaling the LDS to confirm the switch to clear channel mode using the corresponding signaling bits in the upstream data link (step 908).

After receiving the acknowledgment of the mode switch from the RT, the LDS completes the switch of its own operations to clear channel mode (step 910). This involves ceasing to use robbed-bit signaling in generating the corresponding downstream DS0 channel. As with the RT, to ensure stable system operations, the LDS preferably verifies that the corresponding data link upstream signaling bit has maintained the clear channel mode value for a specified duration (e.g., 36 msec) before completing its switch to clear channel mode.

Unlike the S1 method, in the S2 method, depending on the situation, the decision as to whether a switch from clear channel mode back to RBS mode is warranted may be made at either the LDS or the RT. As such, different processing is involved in these two different cases. As described earlier, in the RDT-to-LDS (upstream) direction, instead of conveying on-hook/off-hook information over the data link (as in the S1 method), the RT uses the upstream data link to tell the LDS whether each subscriber line should be operated in RBS mode or in clear channel mode (e.g., 1=RBS, 0=clear channel).

Figure 10:
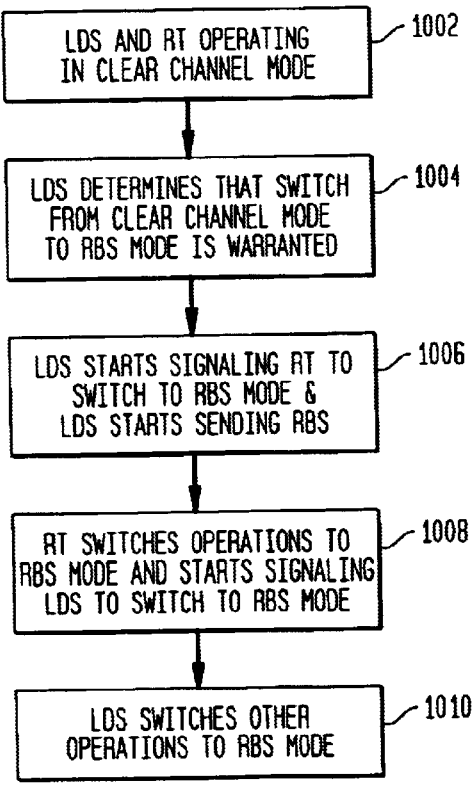
FIG. 10 shows a flow diagram of the processing implemented within the DLC system of FIG. 5 for a switch from clear channel mode back to RBS mode for a particular DS0 channel, according to one embodiment of the S2 method of the present invention, when the switch is initiated at the LDS.

FIG. 10 shows a flow diagram of the processing implemented within DLC system 500 for a switch from clear channel mode back to RBS mode for a particular DS0 channel, according to one embodiment of the S2 method of the present invention, when the switch is initiated at LDS 520. The processing of FIG. 10 corresponds to steps 56 and 62 of FIG. 3. At the start of processing (step 1002), both LDS 520 and RT 528 are assumed to be operating in clear channel mode.

After the LDS determines that a switch from clear channel mode to RBS mode is warranted (step 1004), the LDS begins to signal the RT to switch to RBS mode using the corresponding signaling bits in the downstream data link, and the LDS starts generating the corresponding downstream DS0 channel using robbed-bit signaling (step 1006).

The RT receives the RBS mode signal from the LDS and switches its operations back to RBS mode (step 1008). This involves both (1) starting to use robbed-bit signaling in generating the corresponding upstream DS0 channel and (2) starting to monitor the corresponding downstream DS0 channel for robbed-bit signals. To ensure stable system operations, the RT preferably verifies that the corresponding downstream data link signaling bit has maintained the RBS mode value for a specified duration (e.g., 36 msec) before changing its operations to RBS mode. At that time, the RT starts signaling the LDS to switch to RBS mode using the corresponding signaling bits in the upstream data link (step 1008).

After receiving acknowledgment from the RT, the LDS completes the switch of its own operations to RBS mode (step 1010). This involves starting to monitor the corresponding upstream DS0 channel for robbed-bit signals. As with the RT, to ensure stable system operations, the LDS preferably verifies that the corresponding upstream data link signaling bit has maintained the RBS mode value for a specified duration (e.g., 36 msec) before completing its switch to RBS mode.

Figure 11:
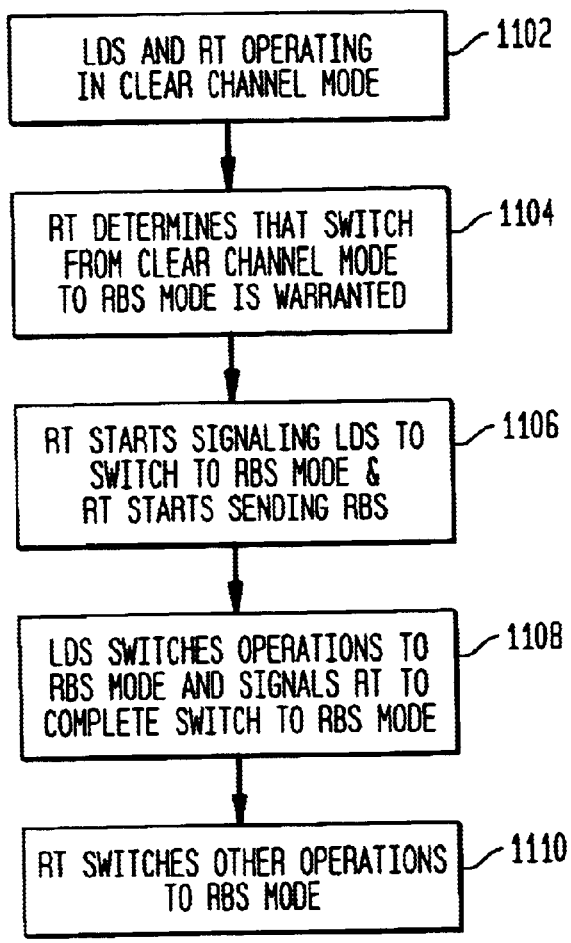
FIG. 11 shows a flow diagram of the processing implemented within the DLC system of FIG. 5 for a switch from clear channel mode back to RBS mode for a particular DS0 channel, according to one embodiment of the S2 method of the present invention, when the switch is initiated at the RT.

FIG. 11 shows a flow diagram of the processing implemented within DLC system 500 for a switch from clear channel mode back to RBS mode for a particular DS0 channel, according to one embodiment of the S2 method of the present invention, when the switch is initiated at RT 528. The processing of FIG. 11 corresponds to steps 56 and 62 of FIG. 3. At the start of processing (step 1102), both LDS 520 and RT 528 are assumed to be operating in clear channel mode.

After the RT determines that a switch from clear channel mode to RBS mode is warranted (e.g., the corresponding subscriber line has been on-hook for a specified duration (e.g., 20 msec)) (step 1104), the RT begins to signal the LDS to switch to RBS mode using the corresponding signaling bits in the upstream data link, and the RT starts to use robbed-bit signaling in generating the corresponding upstream DS0 channel (step 1106).

The LDS receives the RBS mode signal from the RT and switches its operations back to RBS mode (step 1108). This involves both (1) starting to use robbed-bit signaling in generating the corresponding downstream DS0 channel and (2) starting to monitor the corresponding upstream DS0 channel for robbed-bit signals. To ensure stable system operations, the LDS preferably verifies that the corresponding upstream data link signaling bit has maintained the RBS mode value for a specified duration (e.g., 36 msec) before changing its operations to RBS mode. At that time, the LDS starts signaling the RT using the corresponding signaling bits in the downstream data link to complete the switch to RBS mode (step 1108). The RT receives the RBS mode signal from the LDS and completes the switch of its operations to the RBS mode (step 1110). This involves starting to monitor the corresponding downstream DS0 channel for robbed-bit signals.

In both the S1 and S2 methods, the durations that the LDS and the RT wait for switches from RBS mode to clear channel mode may be—but do not have to be—different from the durations that the LDS and the RT wait for switches from clear channel mode to RBS mode.

Two-Stage DLC Systems

To this point, the present invention has been described in the context of one-stage DLC systems, such as TR-303 DLC system 10 of FIG. 1 and TR-008 DLC system 500 of FIG. 1. As suggested earlier, the present invention can also be implemented in the context of two-stage DLC systems.

Figure 12:
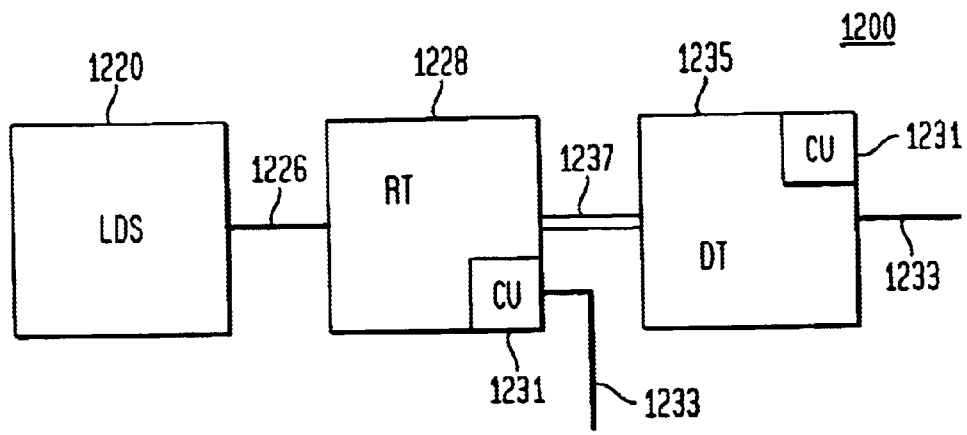
FIG. 12 shows a block diagram of a two-stage DLC system.

FIG. 12 shows a block diagram of an exemplary two-stage DLC system 1200, comprising an LDS 1230 connected to an RT 1228 by a first communication link 1226, and a distant terminal (DT) 1235 connected to RT 1228 by a second communication link 1237. As indicated in FIG. 12, DT 1235 is configured with one or more customer units 1231 for supporting one or more subscriber lines 1233. In addition and optionally, depending on the particular implementation of two-stage DLC system 1200, RT 1228 may also be configured with one or more CUs 1231 for directly supporting one or more subscriber lines 1233. For the rest of this discussion, it will be assumed that RT 1228 does not have any CUs and does not therefore directly support any subscriber lines, although the principles of the present invention can certainly be applied in such configurations.

Depending on the particular application, first communication link 1226 may conform to one of the TR-303 protocol, the TR-008 protocol, or any other suitable protocol. When first communication link 1226 conforms to the TR-303 protocol, the processing involved in switching link 1226 between RBS mode and clear channel mode may be based on the methods described previously in the context of FIGS. 1–4 which rely on TMC channels for mode-switching signaling. Similarly, when first communication link 1226 conforms to the TR-008 protocol, the processing involved in switching link 1226 between RBS mode and clear channel mode may be based on the methods described previously in the context of FIGS. 5–11, which rely on the concentration field in the TR-008 data link format for mode-switching signaling.

Figure 13:
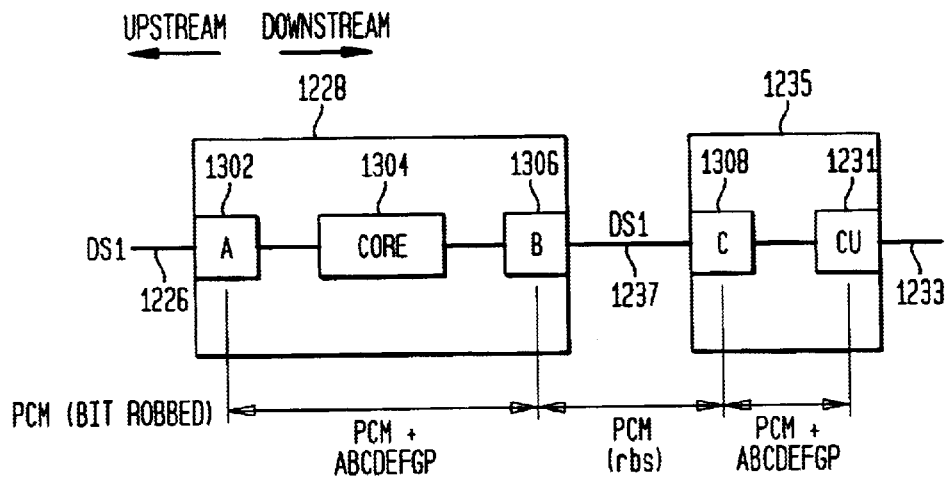
FIG. 13 shows a block diagram of a portion of the two-stage DLC system of FIG. 12.

FIG. 13 shows a block diagram of a portion of two-stage DLC system 1200 of FIG. 12. As shown in FIG. 13, RT 1228 comprises interface A 1302 (which provides the interface between communication link 1226 and RT 1228), processing core 1304, and interface B 1306 (which provides the interface between RT 1228 and communication link 1237). Similarly, DT 1235 comprises interface C 1308 (which provides the interface between communication link 1237 and DT 1235) and CU 1231 (which provides the interface between DT 1235 and subscriber line 1233).

As was the case with communication link 526 in TR-008 DLC system 500 of FIG. 5, communication link 1237 might not have any TMC channels available for signaling to implement switching between RBS mode and clear channel mode. Moreover, the ability to use the concentration fields in the TR-008 data link format for mode-switching signaling (as described in the context of FIGS. 5–11) requires each of the DS1s in the corresponding communication link to be configured with its own data link. There may be situations in which such a configuration of the communication link is 1–5 impractical, impossible, or otherwise undesirable.

The following discussion is directed to an implementation of the general mode-switching algorithm of FIG. 3 that is applicable to communication link 1237 of two-stage DLC system 1200 of FIGS. 12–13. According to this implementation, communication link 1237 is assumed to have a DS1 structure that supports robbed-bit signaling. In addition, switching from RBS mode to clear channel mode is always initiated at LDS 1220, while switching from clear channel mode back to RBS mode may be initiated at either LDS 1220 or at DT 1235. At all times, whether operating in RBS mode or clear channel mode, RT 1228 is assumed to monitor the upstream DS0 channels received from DT 1235 for upstream robbed-bit signals, and DT 1235 is assumed to monitor the downstream DS0 channels received from RT 1228 for downstream robbed-bit signals. Valid robbed-bit signals might not be present (e.g., during clear channel mode), but RT 1228 and DT 1235 nevertheless still both process the corresponding DS0 channels as if they were generated using RBS signaling.

In general, in a two-stage system, the CU will convert the upstream second-stage DS0 channel to RBS mode and the downstream second-stage DS0 channel will be converted to RBS mode by the RT detecting either a flash or on-hook condition. The LDS decides whether to convert the first-stage DS0 channel to RBS mode. In first-stage DS0 channels conforming to the TR-303 protocol, this is accomplished via the resume TMC message.

Figure 14:
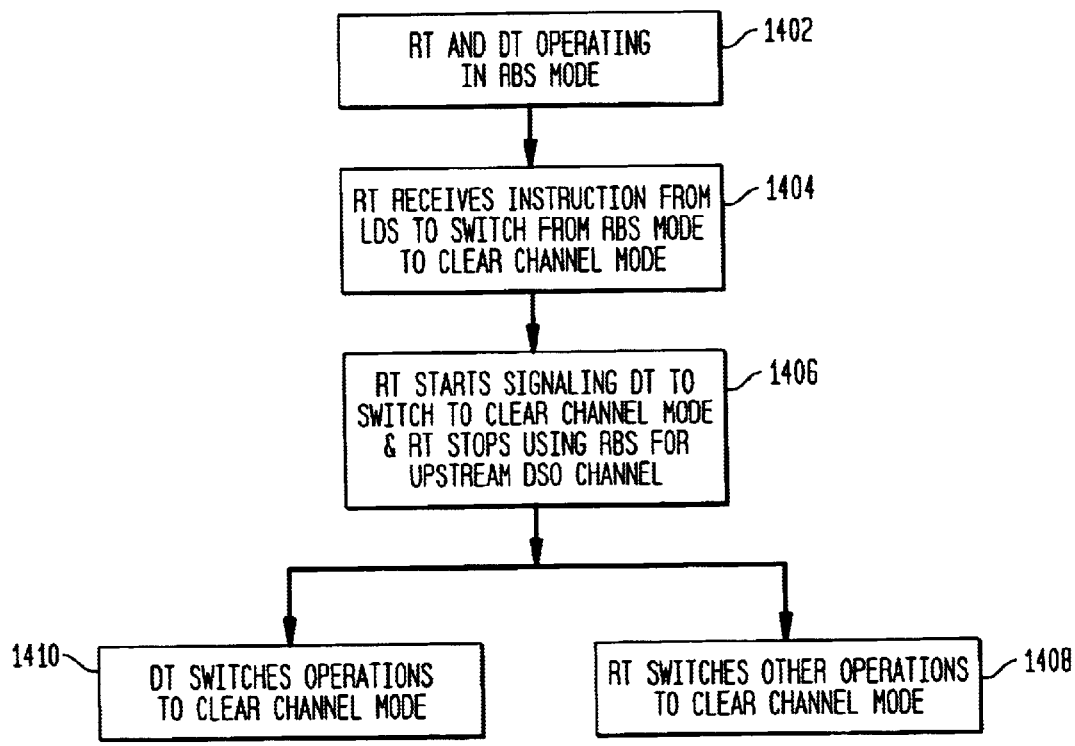
FIG. 14 shows a flow diagram of the processing implemented within the RT and the DT of the DLC system of FIGS. 12–13 for switching the corresponding communication link from RBS mode to clear channel mode for a particular DS0 channel, according to one embodiment of the present invention.

FIG. 14 shows a flow diagram of the processing implemented within RT 1228 and DT 1235 of DLC system 1200 of FIGS. 12–13 for switching communication link 1237 from RBS mode to clear channel mode for a particular DS0 channel, according to one embodiment of the present invention. The processing of FIG. 14 corresponds to step 54 of FIG. 3. As described earlier, processing within LDS 1220 and RT 1228 related to switching communication link 1226 from RBS mode to clear channel mode will depend on the particular protocol to which communication link 1226 conforms and is outside the scope of the processing shown in FIG. 14.

At the start of processing (step 1402), both RT 1228 and DT 1235 are assumed to be operating in RBS mode. In the downstream direction, (1) the RT core relays robbed-bit signals in the downstream signals received from LDS 1220 to interface B, (2) interface B in the RT generates downstream signals for transmission to the DT using RBS signaling, and (3) the CU in the DT monitors the downstream signals received from the RT for robbed-bit signals. In the upstream direction, (1) interface C in the DT generates upstream signals for transmission to the RT using RBS signaling, (2) the RT core relays the robbed-bit signals in the upstream signals received from the DT to interface A, and (3) interface A in the RT generates upstream signals for transmission to LDS 1220 using RBS signaling.

As indicated in FIG. 13, during RBS mode, RT 1228 processes each downstream DS0 channel received from LDS 1220 over communication link 1226 to extract robbed bits to construct an 8-bit signaling word ABCDEFGP. Bits EFGP are used by RT 1228 to control operations within RT 1228. In addition, RT 1228 uses RBS signaling to encode bits ABCD into the corresponding downstream DS0 channel generated for transmission to DT 1235 over communication link 1237. DT 1235, in turn, processes that received downstream DS0 channel to extract the robbed-bit code ABCD, which is used to convey different operating instructions to CU 1231 (e.g., one particular code value instructs the CU to ring the phone connected to the corresponding subscriber line 1233).

At a time controlled by LDS 1220, RT 1228 receives instructions from the LDS to switch from RBS mode to clear channel mode (step 1404). Depending on the protocol of communication link 1226, these instructions may be transmitted by the LDS using RBS in-band signaling, a TR-303 TMC channel, the concentration field of a TR-008 data link, or some other suitable signaling mechanism.

In any case, in response to those instructions, the RT starts signaling DT 1235 to switch to clear channel mode and the RT stops using RBS signaling when generating the corresponding upstream DS0 channel for transmission to the LDS (step 1406). In particular, the RT core sets the upstream F bit to a value (e.g., 0) indicating that interface A should stop using RBS signaling in generating the corresponding upstream DS0 channel. In addition, for a specified duration (e.g., 75 msec), the RT core sets the downstream robbed bits ABCD to a particular code value for instructing the corresponding CU to switch to clear channel mode, and interface B encodes that code value ABCD into the corresponding downstream DS0 channel using RBS signaling.

After the specified duration, the RT switches the rest of its own operations to clear channel mode (step 1408). In particular, RT core 1304 sets the downstream F bit to a value (e.g., 0) indicating that interface B should stop using RBS signaling in generating the downstream DS0 channel.

Meanwhile, the DT receives the clear channel mode signal from the RT and switches its operations to clear channel mode (step 1410). In particular, the corresponding CU 1231 detects the code value for switching to clear channel mode and sets the upstream F bit to a value (e.g., 0) to instruct interface C to stop using RBS signaling in generating the upstream DS0 channel. To ensure stable system operations, the CU preferably verifies that the code value has maintained the clear channel mode value for a specified duration (e.g., 36 msec) before changing its operations to clear channel mode.

As described earlier, the decision as to whether a switch from clear channel mode back to RBS mode is warranted may be made at either the LDS or the DT. As such, different processing is involved in these two different cases.

Figure 15:
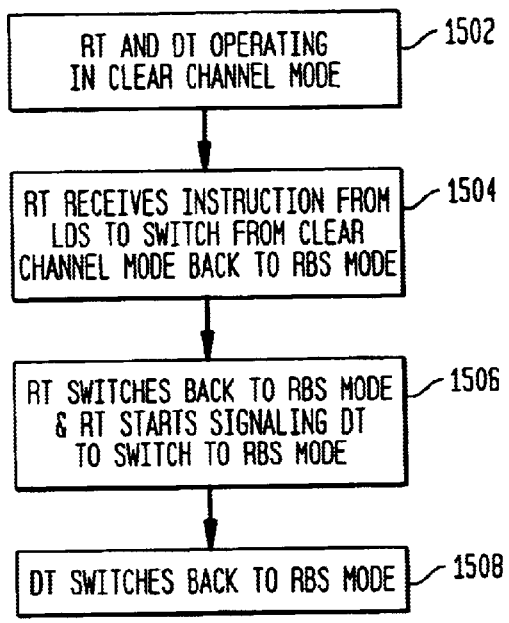
FIG. 15 shows a flow diagram of the processing implemented within the RT and the DT of the DLC system of FIGS. 12–13 for switching the corresponding communication link from clear channel mode back to RBS mode for a particular DS0 channel, according to one embodiment of the present invention, when the switch is initiated at the LDS.

FIG. 15 shows a flow diagram of the processing implemented within RT 1228 and DT 1235 of DLC system 1200 of FIGS. 12–13 for switching communication link 1237 from clear channel mode back to RBS mode for a particular DS0 channel, according to one embodiment of the present invention, when the switch is initiated at LDS 1220. The processing of FIG. 15 corresponds to step 56 and 62 of FIG. 3. As described earlier, processing within LDS 1220 and RT 1228 related to switching communication link 1226 from clear channel mode back to RBS mode will depend on the particular protocol to which communication link 1226 conforms and is outside the scope of the processing shown in FIG. 15.

At the start of processing (step 1502), both RT 1228 and DT 1235 are assumed to be operating in clear channel mode, such that (1) interface B in the RT generates downstream signals for transmission to the DT without using RBS signaling, (2) interface C in the DT generates upstream signals for transmission to the RT without using RBS signaling, and (3) interface A in the RT generates upstream signals for transmission to the LDS without using RBS signaling.

At a time controlled by LDS 1220, RT 1228 receives instructions from the LDS to switch from clear channel mode back to RBS mode (step 1504). Depending on the protocol of communication link 1226, these instructions may be transmitted by the LDS using a TR-303 TMC channel, the concentration field of a TR-008 data link, or some other suitable signaling mechanism.

In any case, in response to those instructions, the RT changes its operations back to RBS mode and starts signaling the DT to switch back to RBS mode as well (step 1506). In particular, RT core 1304 sets the upstream F bit to a value (e.g., 1) indicating that interface A should resume using RBS signaling in generating the upstream DS0 channel. In addition, RT core 1304 sets the downstream F bit to a value (e.g., 1) indicating that interface B should resume using RBS signaling in generating the downstream DS0 channel, with bits ABCD set to a particular code value for instructing a CU to switch back to RBS mode so that interface B will encode that code value ABCD into the corresponding downstream DS0 channel using RBS signaling.

The DT receives the RBS mode signal from the RT and switches its operations back to RBS mode (step 1508). In particular, the corresponding CU 1231, which continues to monitor the DS0 channel for valid robbed bits during clear channel mode, detects the valid code value for switching back to RBS mode and sets the upstream F bit to a value (e.g., 1) to instruct interface C to resume using RBS signaling in generating the upstream DS0 channel. To ensure stable system operations, the CU preferably verifies that the code value ABCD has maintained the RBS mode value for a specified duration (e.g., 200 msec) before changing its operations back to RBS mode.

Figure 16:
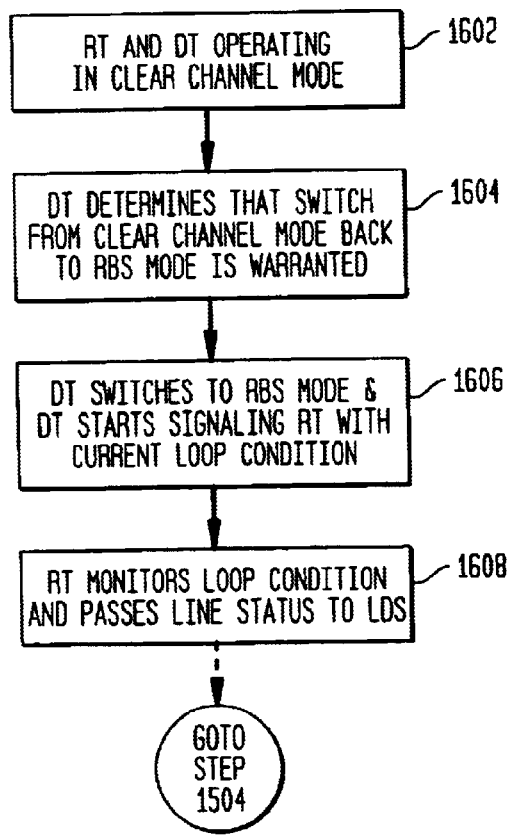
FIG. 16 shows a flow diagram of the processing implemented within the RT and the DT of the DLC system of FIGS. 12–13 for switching the corresponding communication link from clear channel mode back to RBS mode for a particular DS0 channel, according to one embodiment of the present invention, when the switch is initiated at the DT.

FIG. 16 shows a flow diagram of the processing implemented within RT 1228 and DT 1235 of DLC system 1200 of FIGS. 12–13 for switching communication link 1237 from clear channel mode back to RBS mode for a particular DS0 channel, according to one embodiment of the present invention, when the switch is initiated at DT 1235. The processing of FIG. 16 corresponds to step 56 and 62 of FIG. 3. As described earlier, processing within LDS 1220 and RT 1228 related to switching communication link 1226 from clear channel mode back to RBS mode will depend on the particular protocol to which communication link 1226 conforms and is outside the scope of the processing shown in FIG. 16.

As in step 1502 of FIG. 15, at the start of processing (step 1602), both RT 1228 and DT 1235 are assumed to be operating in clear channel mode.

After the DT determines that a switch from clear channel mode to RBS mode is warranted (step 1604), the DT switches its operations back to the RBS mode and begins to use RBS signaling to pass the current loop condition (e.g., loop open) to the RT (step 1606). In particular, the corresponding CU 1231, which always monitors the subscriber line for the current loop open/closed condition, detects when the subscriber line has maintained a loop-open condition for a specified time period (e.g., 20 msec) and sets the upstream signaling bit F to a value (e.g., 1) to instruct interface C to resume using RBS signaling in generating the corresponding upstream DS0 channel with the robbed bits ABCD indicating the current loop condition.

The RT monitors the current loop condition and passes the corresponding line status to the LDS (step 1608). In particular, RT core 1304, which always monitors the upstream DS0 channels for valid robbed-bit values, (1) detects that the bits ABCD correspond to a valid loop-condition code, (2) uses the current loop condition to determine the current line status (i.e., on hook, off hook, flash hook), and (3) instructs interface A to report the current line status to the LDS (e.g., via a TR-303 TMC channel).

In order to perform these operations, the RT core must be able to distinguish valid robbed-bit code values that will occur when the DT is operating in RBS mode from random, invalid bit values that will occur when the DT is operating in clear channel mode. Moreover, the RT core should be able to make that determination in a relatively short period of time. In general, the RT core monitors bits ABCD for the two valid code values corresponding to the loop-open and loop-closed conditions (i.e., two of the sixteen different possible values of bits ABCD). When bits ABCD indicate specific valid code values for specified durations, the RT core will determine (1) that the bits correspond to valid robbed-bit signals and (2) the current line status from those code values. The exact durations may depend on whether the flash-hook feature is enabled for the corresponding subscriber line.

During clear channel mode, there is no in-band RBS signaling between the RT and the LDS through which the RT can report line status to the LDS. As such, according to preferred embodiments of the present invention, the RT has specific line-scanning capability that is used during clear channel mode to determine line status. The line-scanning capability is independent of the protocol (e.g., TR-303 or TR-008) used for the communication link between the LDS and the RT. The RT monitors the upstream ABCD bit patterns that are generated by the CU to reflect the subscriber line status (either on-hook or off-hook).

Specifically, the RT core is responsible for scanning the upstream ABCD patterns received at interface B from the CU. The RT may not be able to distinguish the state of the upstream DS0 channels on the communication link (i.e., either RBS or clear channel), when an effective architecture capability providing access to the status of the DT-resident upstream F bits does not exist. Thus, the RT is preferably adapted to support a scanning algorithm which can effectively filter out fluctuating DS0 channels due to clear channel mode operation.

Note that a DS0 channel can only be in clear channel mode if a stable call is present on the corresponding subscriber line. Therefore, by default, clear channel filtering is only necessary when the line is off hook. The most effective means of filtering clear channel data is to count valid consecutive on-hook samples. This can be accomplished by (1) setting a counter to 0 if the detected ABCD pattern corresponds to the off-hook pattern or one of the 14 data patterns and (2) incrementing the counter if the detected ABCD pattern corresponds to the on-hook pattern.

A typical threshold for determining on-hook status for a line without flash enabled is 200 msec. When the maximum rate at which ABCD samples are transmitted across a DS1 is once every 3 msec, a DS0 channel can be considered to be on hook after 67 consecutive on-hook samples have been detected, and the RT can then report that on-hook status to the LDS. This algorithm greatly reduces the probability of detecting a false on-hook status during clear channel mode, where, assuming random data, the probability of a false detection is $\frac{1}{16}^{67}$, where $\frac{1}{16}$ is the possibility of one ABCD sample having the on-hook ABCD pattern.

Having the RT scan all 24 DS0 channels every 3 msec may be too costly in terms of processing time. One alternative possibility is to make the RT scanning algorithm automatically adaptable. For example, until an on-hook pattern is detected, the RT may scan all 24 DS0 channels once every X msec, where X is greater than 3 (e.g., X=15), until the on-hook pattern is detected. Once the on-hook pattern is detected, the sampling rate can be increased for that particular DS0 channel to, for example, once every 3 msec to reduce the probability of detecting a false on-hook when the DS0 channel is in clear channel mode.

For example, suppose the RT is scanning the 24 DS0 channels associated with a DS1 of communication link 1237 every 15 msec. Assume further that a single DS0 channel has a stable two-stage clear channel call up for a subscriber line 1233. The RT will sample the DS0 channel with the stable call every 15 msec until the ABCD bit pattern indicating on hook is detected. The scanning algorithm then adapts the sample rate to 3 msec for this DS0 channel. Note that, since the DS0 channel is in clear channel mode, the ABCD pattern is typically fluctuating randomly from sample to sample. Now, suppose that the next ABCD pattern is something other than on hook. The RT then adapts the ABCD scanning algorithm back to 15 mS and clears the count for this DS0 channel and so on.

Now, suppose the subscriber line goes on hook. The CU detects the on-hook condition and sets the upstream F bit to 1, which converts the associated DS0 channel on DS1 1237 to RBS mode. The RT scanning algorithm immediately detects the on-hook ABCD pattern and adjusts to 3-msec samples. The RT determines that the line is really on hook after 67 consecutive samples and then informs the LDS of the line state change. The LDS then proceeds with the call release process.

Figure 17:
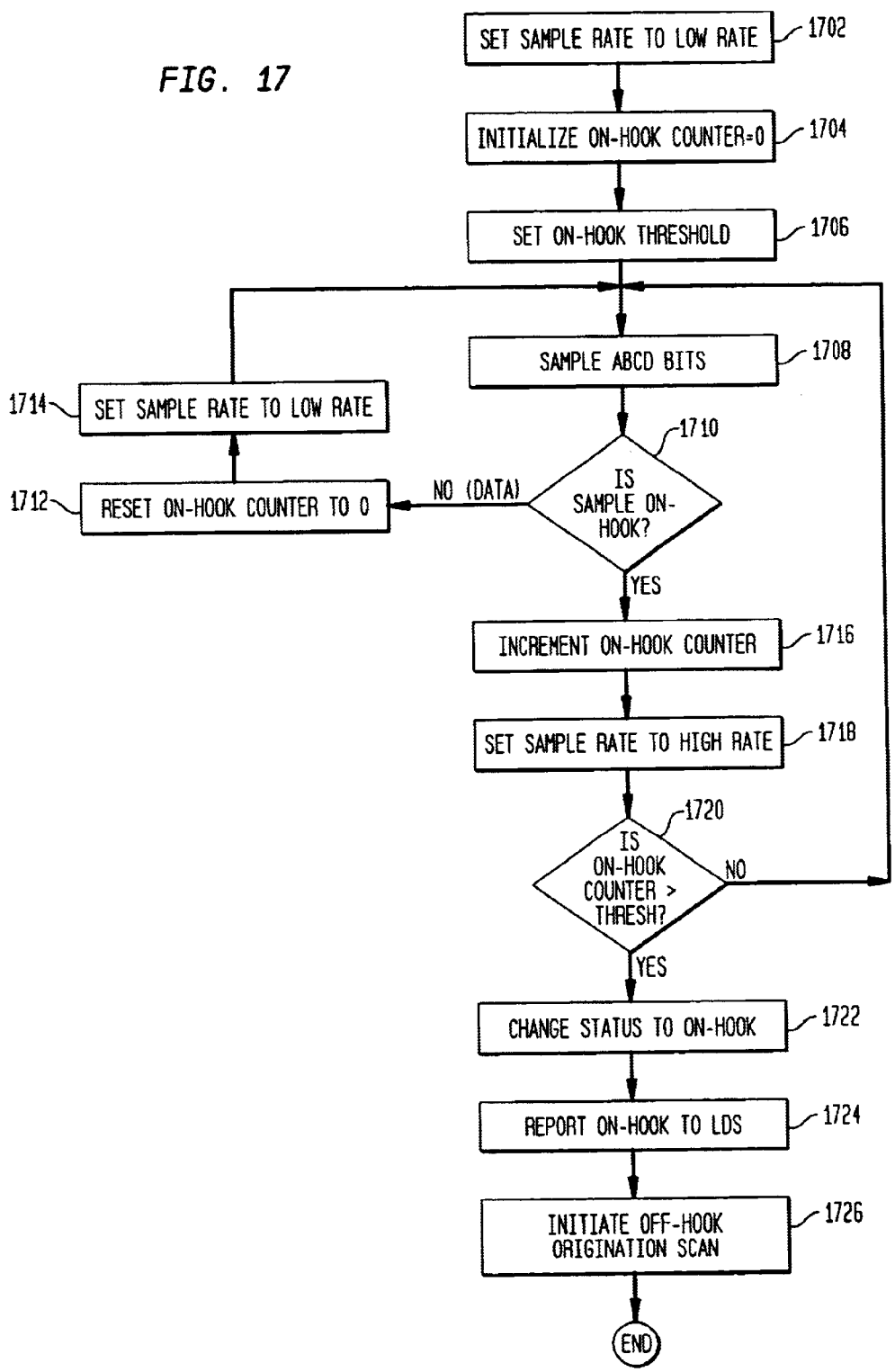
FIG. 17 shows a flow diagram of line-scanning processing implemented at the RT of the DLC system of FIGS. 12–13 for a DS0 channel, according to one embodiment of the present invention, when the flash-hook feature is not enabled for that channel.

FIG. 17 shows a flow diagram of line-scanning processing implemented at RT 1228 of DLC system 1200 of FIGS. 12–13 for a DS0 channel, according to one embodiment of the present invention, when the flash-hook feature is not enabled for that channel. The processing of FIG. 17 is part of step 1608 of FIG. 16. At the start of processing in FIG. 17, it is assumed that the RT is operating in clear channel mode with a stable call (i.e., off-hook status) on the corresponding subscriber line.

The processing of FIG. 17 begins by setting the sampling rate at which the RT samples the upstream ABCD bits received from the CU to the low sampling rate (e.g., once every 15 msec) (step 1702), initializing the on-hook counter to 0 (step 1704), and setting the on-hook threshold value (e.g., corresponding to 200 msec, when flash hook is not enabled) (step 1706).

In step 1708, the ABCD bits are extracted from the upstream signal received from the corresponding CU at the currently selected sampling rate. If the ABCD bits do not correspond to the on-hook pattern (step 1710), then the sample is determined to be clear channel data, the on-hook counter is reset to zero (step 1712), and the sampling rate is set to the low rate (step 1714), before returning to step 1708 to extract the next sample of ABCD bits at the low sampling rate.

If, on the other hand, the ABCD bits do correspond to the on-hook pattern (step 1710), then the on-hook counter is incremented by one (step 1716), and the sampling rate is set to the high rate (e.g., once every 3 msec) (step 1718). The on-hook counter is then compared to the on-hook threshold specified in step 1706. If the on-hook counter is not greater than the on-hook threshold, then the processing returns to step 1708 for the next ABCD-bit sample with the high sampling rate selected. On the other hand, if the counter is greater than the on-hook threshold, then the line status is changed to on-hook (step 1722), the on-hook status is reported by the RT to the LDS (step 1724), and an off-hook origination scan is initiated (step 1726).

During the call (i.e., before the subscriber line first goes on hook), routine processing will flow from step 1708 through steps 1710, 1712, and 1714 before returning to step 1708. When the subscriber line first goes on hook, after step 1708, processing will flow through steps 1710, 1716, 1718, and 1720 before returning to step 1708. If the subscriber line stays on hook for longer than the on-hook threshold (e.g., corresponding to 200 msec), then, after step 1720, processing will flow to steps 1722, 1724, and 1726 to change the line status to on hook.

A typical threshold for determining on-hook status for a line with flash enabled is 1200 msec. When flash is enabled and the line has established a steady off-hook status, the following algorithm may be applied to determine whether the line status has changed from off hook to either flash or on hook. If the line goes on hook for less than 200 msec before returning to off hook, then the line status may be assumed to remain unchanged (i.e., off hook). If the line goes on hook for more than 200 msec, but less than 1200 msec before returning to off hook, then the line status may be assumed to change to the flash-hook status. If the line goes on hook for more than 1200 msec, then the line status may be assumed to change to the on-hook status. In preferred embodiments of the present invention, the RT applies an adaptive line-scanning algorithm similar to the one described above to detect changes in the line status from off hook to flash or on hook.

Figure 18:
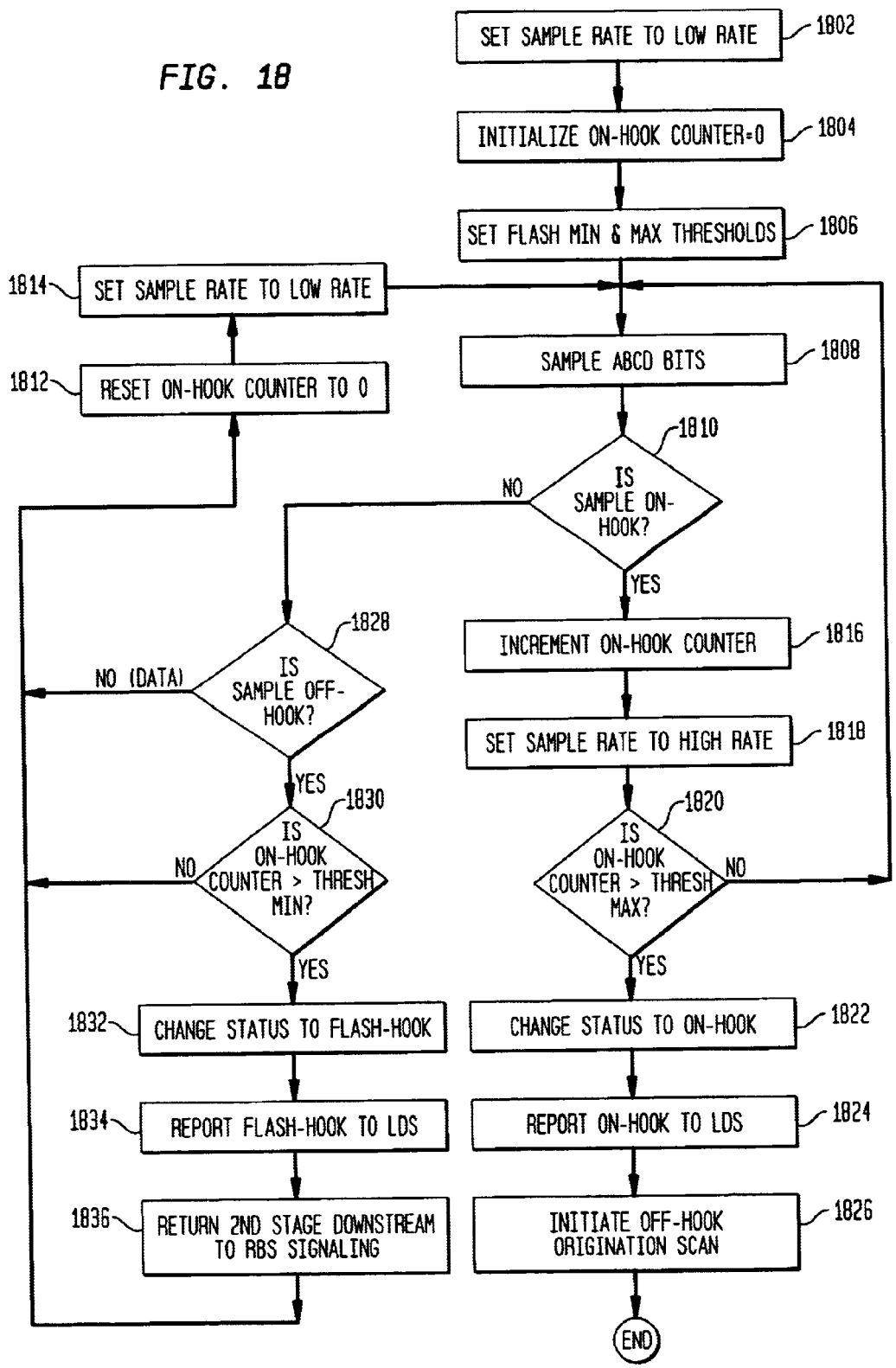
FIG. 18 shows a flow diagram of line-scanning processing implemented at the RT of the DLC system of FIGS. 12–13 for a DS0 channel, according to one embodiment of the present invention, when the flash-hook feature is enabled for that channel.

FIG. 18 shows a flow diagram of line-scanning processing implemented at RT 1228 of DLC system 1200 of FIGS. 12–13 for a DS0 channel, according to one embodiment of the present invention, when the flash-hook feature is enabled for that channel. The processing of FIG. 18 is part of step 1608 of FIG. 16. At the start of processing in FIG. 18, it is assumed that the RT is operating in clear channel mode with a stable call (i.e., off-hook status) on the corresponding subscriber line and with the RT sampling the upstream ABCD bits received from the CU at the low sampling rate (e.g., once every 15 msec).

The processing of steps 1802–1826 is analogous to the processing of steps 1702–1726 of FIG. 17 related to the detection of an on-hook status, except that: (1) in step 1806, thresholds are set for both flash min (e.g., corresponding to 200 msec) and flash max (e.g., corresponding to 1200 msec) and (2) in step 1820, the comparison is made using the flash max threshold. In addition, FIG. 18 has new steps 1828–1836, which are designed to detect a flash-hook.

In particular, when the current ABCD sample does not correspond to on-hook (step 1810), processing flows to step 1828. If the sample does not correspond to off-hook (step 1828), then the sample is determined to be clear channel data and processing continues to step 1812. If, however, the sample does correspond to off-hook, then processing continues to step 1830, where the on-hook counter is compared to the flash min threshold. If the on-hook counter is less than the flash min threshold, then either a flash hook of too short a duration has occurred or the sample is a data sample equal to the off-hook ABCD code. In both cases, the sample is effectively filtered by having the processing continue directly to step 1812. If, however, the on-hook counter is greater than the flash min threshold, then the line status is changed to flash-hook (step 1732), the flash-hook status is reported by the RT to the LDS (step 1734), and RBS signaling is resumed at the RT for downstream DS0 channel in the second-stage DS1 transmitted to the CU (step 1736). The CU converts the upstream DS0 channel of the second-stage DS1 to RBS mode after a specified duration (e.g., 20 msec) of on hook.

During the call (i.e., before the subscriber line first goes on hook), routine processing will flow from step 1808 through steps 1810, 1828, 1812, and 1814 before returning to step 1808. When the subscriber line first goes on hook, after step 1808, processing will flow through steps 1810, 1816, 1818, and 1820 before returning to step 1808. If the subscriber line stays on hook for longer than the flash max threshold (e.g., corresponding to 1200 msec), then, after step 1820, processing will flow to steps 1722, 1824, and 1826 to change the line status to on-hook.

When a flash-hook is performed, the subscriber lines goes from off-hook to on-hook and then back to off-hook after less than 1200 msec but longer than 200 msec. In that case, after step 1808, processing will flow through steps 1828, 1830, 1832, 1834, and 1836 to change the line status to flash-hook. In an alternative embodiment, the RT verifies that the return to off hook occurs for a specified duration (e.g., 24 msec) before changing the status to flash in step 1708. When there is 8-msec granularity, the 24-msec duration is preferably selected to ensure at least two full cycles of off-hook status before concluding that the current line status is flash hook (e.g., as opposed to on hook with an erroneous ABCD bit pattern).

For TR-303 and TR-008 Method S1, the LDS is responsible for determining whether or not to complete the process of switching a stage 1 DS0 channel from the clear channel mode back to the RBS mode. If the LDS determines that the switch is warranted, processing continues according to steps 1504 and 1506 of FIG. 15. Note that the operations of step 1508 will have already been implemented in step 1606 of FIG. 16. If the LDS determines that the switch is not warranted, then the LDS and the RT will continue to operate in clear channel mode, with the DT operating in RBS mode upstream. This will not be a problem since the processing implemented by the DT in step 1604 will have already determined that the call is not a modem call, and there will be no significant adverse effects to using RBS signaling at the DT for a voice call.

In general, the durations that the RT and the DT wait for switches from RBS mode to clear channel mode may be different from the durations that the RT and the DT wait for switches from clear channel mode to RBS mode.

Earlier in this specification, with regard to FIGS. 5–11, the present invention was described in the context of a one-stage DLC system in which the communication link between an LDS and an RT conformed to the TR-008 protocol. In this context, the S1 and S2 methods were described as relying on the concentration field of the TR-008 data link for certain mode-switching signaling. Those skilled in the art will understand that methods analogous to the S1 and S2 methods can be implemented in which the mode-switching signaling is conveyed without using the TR-008 data link concentration field. For example, in alternative implementations of the S1 and S2 methods, a TR-303 4 kbps Extended Super Frame (ESF) data link could be used for mode-switching signaling for the communication link between the LDS and the RT. Moreover, in two-stage systems, similar to those shown in FIGS. 12–13, methods analogous to the S1 and S2 methods could be implemented using a 4 kbps ESF data link for the DS1 communication link between the RT and DT.

The reference to figures in the claims is intended to identify one or more possible embodiments of the claimed subject matter in order to facilitate the interpretation of the claims. Such reference is not to be construed as necessarily limiting the scope of those claims to the embodiments shown in the identified figures.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A method for conveying information in a communication network, the method comprising the steps of:
   (a) establishing communication in accordance with a protocol having an in-band signaling scheme, where the protocol being followed is one of the TR-303 Hybrid Signaling protocol and the TR-008 protocol; and
   (b) conveying user information free of in-band signaling information so as to reduce information error rates associated with the conveyed user information.

2. The method of claim 1, further comprises the step of conveying user information that includes signaling information when conditions in the communication network warrant such a change.

3. The method of claim 1, where the user information is conveyed free of signaling information for a period of time during conveyance of user information.

4. The method of claim 1, where the step of conveying user information free of signaling information further comprises the step of conveying signaling information over an out-of-band channel.

5. The method of claim 1, where the protocol being followed is the TR-303 Hybrid Signaling protocol.

6. The method of claim 1, wherein steps (a) and (b) are implemented at a single node in the communication network.

7. A method for conveying information in a local access network that follows a protocol which uses in-band signaling, the method comprising the steps of:

(a) establishing communication between at least two users in accordance with the protocol;
(b) suspending in-band signaling;
(c) entering a clear channel mode;
(d) remaining in the clear channel mode until it is determined that conditions exist which warrant returning to in-band signaling; and
(e) ending the established communication when at least one of the users terminates communication, wherein:
   the local access network comprises an upstream node connected to a downstream node by a communication link having a data link;
   the in-band signaling comprises robbed-bit signaling (RBS); and
   during the clear channel mode, signaling information is transmitted over the communication link within the data link.

8. The method of claim 7, where the step of establishing communication comprises the step of allocating a communication channel used to convey user information including signaling information.

9. The method of claim 7, where the step of suspending in-band signaling comprises the step of conveying signaling information over an out-of-band communication channel.

10. The method of claim 7, where the step of entering a clear channel mode comprises the step of conveying user information free of signaling information over the allocated communication channel.

11. The method of claim 7, wherein
the communication link comprises at least one DS1 having the data link.

12. The method of claim 11, wherein, during both the clear channel mode and an RBS mode, signaling information is transmitted over the communication link within the data link.

13. The method of claim 11, wherein the upstream node is a local digital switch and the downstream node is a remote terminal.

14. The method of claim 11, wherein:
the communication link comprises a plurality of DS1s, each having a data link; and
during the clear channel mode, signaling information for each DS1 is transmitted over the communication link within the corresponding data link.

15. The method of claim 11, wherein:
the protocol is the TR-008 protocol; and
the signaling information is encoded into a concentration field within the data link.

16. The method of claim 15, wherein:
two of the bits in the concentration field identify a particular set of eight DS0 channels within the DS1; and
each of eight other bits in the concentration field provides one bit of signaling information for a different one of the eight DS0 channels in the particular set.

17. The method of claim 11, wherein steps (b) and (c) comprise the steps of:
(1) the upstream node signals the downstream node to switch to the clear channel mode and the upstream node starts switch to the clear channel mode;
(2) after a first specified duration, the upstream node switches to the clear channel mode; and
(3) after receiving switch-to-clear-channel-mode signals from the upstream node for a second specified duration, the downstream node completes switch to the clear channel mode.

18. The method of claim 11, wherein steps (b) and (c) comprise the steps of:
(1) the upstream node signals the downstream node to switch to the clear channel mode and the upstream node starts switch to the clear channel mode;
(2) after receiving switch-to-clear-channel-mode signals from the upstream node for a first specified duration, the downstream node switches to the clear channel mode and signals the upstream node to switch to the clear channel mode; and
(3) after receiving the switch-to-clear-channel-mode signals from the downstream node for a second specified duration, the upstream node completes switch to the clear channel mode.

19. The method of claim 11, wherein step (d) comprises the steps of:
(1) the upstream node signals the downstream node to switch to an RBS mode and the upstream node starts switch to the RBS mode;
(2) after a first specified duration, the upstream node switches to the RBS mode; and
(3) after receiving switch-to-RBS-mode signals from the upstream node for a second specified duration, the downstream node completes switch to the RBS mode.

20. The method of claim 11, wherein step (d) comprises the steps of:
(1) the upstream node signals the downstream node to switch to an RBS mode and the upstream node starts switch to the RBS mode;
(2) after receiving switch-to-RBS-mode signals from the upstream node for a first specified duration, the downstream node switches to the RBS mode and signals the upstream node to switch to the RBS mode; and
(3) after receiving the switch-to-RBS-mode signals from the downstream node for a second specified duration, the upstream node completes switch to the RBS mode.

21. The method of claim 11, wherein step (d) comprises the steps of:
(1) the downstream node signals the upstream node to switch to an RBS mode and the downstream node starts switch to the RBS mode;
(2) after receiving switch-to-RBS-mode signals from the downstream node for a first specified duration, the upstream node switches to the RBS mode and signals the downstream node to switch to the RBS mode; and
(3) after receiving the switch-to-RBS-mode signals from the upstream node for a second specified duration, the downstream node completes switch to the RBS mode.

22. The method of claim 11, wherein:
the protocol is the TR-303 protocol; an
the data link is an Extended Super Frame data link.

23. The method of claim 7, wherein steps (a)–(e) are implemented at a single node in the local access network.

24. The method of claim 23, wherein the single node comprises an LDS.

25. The method of claim 23, wherein the single node comprises an RT.

26. The method of claim 23, wherein the single node comprises a DT.

27. A method for conveying information in a DLC communication network that follows the TR-303 Hybrid Signaling protocol, the method comprising the steps of:
(a) establishing communication between at least two users using a DS1 frame format for the robbed-bit signaling scheme in accordance with the TR-303 Hybrid Signaling protocol;

(b) suspending the use of robbed-bit signaling;

(c) entering a clear channel mode;

(d) resuming robbed-bit signaling when it has been determined that conditions exist that warrant returning to in-band signaling; and (e) ending the established communication as per the TR-303 Hybrid Signaling protocol when at least one of the users goes on hook.

28. The method of claim 27, where the step of suspending robbed-bit signaling comprises the step of conveying signaling information via a Timeslot Management Channel as defined in the TR-303 Hybrid Signaling protocol.

29. The method of claim 27, where the step of entering a clear channel mode comprises the step of conveying user information free of signaling information over an allocated DS0 channel of the DLC.

30. The method of claim 27, wherein steps (a)–(e) are implemented at a single node in the DLC communication network.

31. A method for conveying information in a local access network that follows a protocol which uses in-band signaling, the method comprising the steps of:

(a) establishing communication between at least two users in accordance with the protocol;

(b) suspending in-band signaling;

(c) entering a clear channel mode;

(d) remaining in the clear channel mode until it is determined that conditions exist which warrant returning to in-band signaling; and (e) ending the established communication when at least one of the users terminates communication, wherein:

steps (a)–(e) are implemented at a single node in the local access network; and the single node comprises one of an LDS, an RT, and a DT.

32. The method of claim 31, wherein the single node comprises an LDS.

33. The method of claim 31, wherein the single node comprises an RTS.

34. The method of claim 31, wherein the single node comprises an DT.

35. A method for conveying information in a local access network that follows a protocol which uses in-band signaling, the method comprising the steps of:

(a) establishing communication between at least two users in accordance with the protocol;

(b) suspending in-band signaling;

(c) entering a clear channel mode;

(d) remaining in the clear channel mode until it is determined that conditions exist which warrant returning to in-band signaling; and (e) ending the established communication when at least one of the users terminates communication, wherein:

the local access network comprises:

an upstream node connected to an intermediate node by a first communication link; and a downstream node connected to the intermediate node by a second communication link; and the in-band signaling over the second communication link comprises robbed-bit signaling.

36. The method of claim 35, wherein the second communication link comprises at least one DS1.

37. The method of claim 36, wherein the upstream node is a local digital switch, the intermediate node is a remote terminal, and the downstream node is a distant terminal.

38. The method of claim 36, wherein:

the intermediate node continues to monitor upstream DS0 channels received from the downstream node for valid robbed-bit signals in the clear channel mode; and the downstream node continues to monitor downstream DS0 channels received from the intermediate node for valid robbed-bit signals in the clear channel mode.

39. The method of claim 36, wherein the first communication link conforms to the TR-303 protocol and the in-band signaling over the first communication link comprises robbed-bit signaling.

40. The method of claim 36, wherein the first communication link conforms to the TR-008 protocol and the in-band signaling over the first communication link comprises robbed-bit signaling.

41. The method of claim 36, wherein steps (b) and (c) comprise the steps of:

(1) the upstream node signals the intermediate node to switch to the clear channel mode;

(2) the intermediate node signals the downstream node to switch to the clear channel mode and the intermediate node starts switch to the clear channel mode;

(3) after a first specified duration, the intermediate node completes switches to the clear channel mode; and (4) after receiving switch-to-clear-channel-mode signals from the intermediate node for a second specified duration, the downstream node switches to the clear channel mode.

42. The method of claim 36, wherein step (d) comprises the steps of:

(1) the upstream node signals the intermediate node to switch to an RBS mode;

(2) the intermediate node switches to the RBS mode and signals the downstream node to switch to the RBS mode using RBS signaling;

(3) after receiving switch-to-RBS-mode signals from the intermediate node for a specified duration, the downstream node switches to the RBS mode.

43. The method of claim 36, wherein step (d) comprises the steps of:

(1) the downstream node determines that a switch to an RBS mode is warranted;

(2) the downstream node switches to the RBS mode and uses RBS signaling to transmit a current loop condition to the intermediate node;

(3) the intermediate node monitors the current loop condition and uses out-of-band signaling to transmit a current line status to the upstream node;

(4) the upstream node confirms that the switch to the RBS mode is warranted and signals the intermediate node to switch to the RBS mode; and (5) the intermediate node switches to the RBS mode.

44. The method of claim 43, wherein:

the downstream node determines that the switch to the RBS mode is warranted after the loop condition is loop-open for a first specified duration; and the intermediate node determines the current line status by monitoring the current loop condition received from the downstream node.

45. The method of claim 44, wherein:

when a flash-hook feature is not enabled, the intermediate node determines that the current line status is on hook after the loop condition is loop open for a second specified duration;

when the flash-hook feature is enabled, the intermediate node determines that the current line status is on hook after the loop condition is loop open for a third specified duration greater than the second specified duration and the intermediate node determines that the current line status is flash hook after the loop condition is loop open for the second specified duration, but not for the third specified duration.

46. The method of claim 44, wherein, in step (d)(3), the intermediate node:
- (i) samples the current loop condition at a first sampling rate before the current loop condition corresponds to loop open; and
- (ii) samples the current loop condition at a second sampling rate greater than the first sampling rate after the current loop condition corresponds to loop open.

* * * * *